(12) United States Patent
Torii et al.

(10) Patent No.: US 8,774,604 B2
(45) Date of Patent: Jul. 8, 2014

(54) INFORMATION PROCESSING APPARATUS, INFORMATION PROCESSING METHOD, AND PROGRAM

(75) Inventors: Kuniaki Torii, Kanagawa (JP); Katsuya Hyodo, Kanagawa (JP); Hikotatsu Chin, Tokyo (JP); Shinichi Kawano, Tokyo (JP); Yusuke Kudo, Tokyo (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 13/154,799

(22) Filed: Jun. 7, 2011

(65) Prior Publication Data

US 2011/0305438 A1 Dec. 15, 2011

(30) Foreign Application Priority Data

Jun. 15, 2010 (JP) ................. P2010-136398

(51) Int. Cl.
*H04N 5/761* (2006.01)

(52) U.S. Cl.
USPC ......................................... 386/282; 386/280

(58) Field of Classification Search
None
See application file for complete search history.

(56) References Cited

U.S. PATENT DOCUMENTS

| | | | |
|---|---|---|---|
| 5,781,188 A | 7/1998 | Amiot et al. | |
| 6,577,807 B1 | 6/2003 | Yaegashi et al. | |
| 2002/0176690 A1 | 11/2002 | Nagasawa | |
| 2006/0184553 A1 | 8/2006 | Liu et al. | |
| 2006/0288288 A1 | 12/2006 | Girgensohn et al. | |
| 2007/0201815 A1 | 8/2007 | Griffin | |
| 2008/0109848 A1 | 5/2008 | Li et al. | |
| 2008/0159708 A1* | 7/2008 | Kazama et al. | 386/69 |
| 2008/0246841 A1 | 10/2008 | Chen et al. | |
| 2009/0148124 A1* | 6/2009 | Athsani et al. | 386/46 |
| 2010/0002084 A1 | 1/2010 | Hattori et al. | |
| 2010/0329635 A1* | 12/2010 | Nishiura | 386/241 |

FOREIGN PATENT DOCUMENTS

| | | |
|---|---|---|
| EP | 1 403 786 | 3/2004 |
| JP | 2005-217886 | 8/2005 |
| JP | 2007-249821 | 9/2007 |
| WO | WO 01/99403 | 12/2001 |
| WO | WO 2004/102343 | 11/2004 |
| WO | WO 2007/082166 | 7/2007 |
| WO | WO 2010/068175 | 6/2010 |

OTHER PUBLICATIONS

Anonymous, "EditStudio Pro Multi-Camera Editing", www.mediachance.com/video/multicamediting.pdf; XP55004807, Jun. 9, 2010.
Anonymous, "Vegas Pro 9 User Manual" http://sony-202.vo.11nwd.net/dspcdn/manuals/vegaspro90d_manual_enu.pdf, XP55004819, Apr. 2, 2010, pp. 141-144.

(Continued)

*Primary Examiner* — William C Vaughn, Jr.
*Assistant Examiner* — Eileen Adams
(74) *Attorney, Agent, or Firm* — Sherr & Jiang, PLLC

(57) ABSTRACT

There is provided an information processing apparatus including a video acquisition section which acquires videos related to a predetermined theme shot by a plurality of imaging devices, a display control section which controls a display of a moving image editing screen including a video selection screen in which the videos acquired by the video acquisition section are arranged on a time axis based on a shooting time of each of the videos, and a moving image generation section which generates a moving image from the videos based on operation performed by a user to the moving image editing screen.

13 Claims, 25 Drawing Sheets

(56) References Cited

OTHER PUBLICATIONS

English-language Partial European Search Report from the European Patent Office mailed Aug. 25, 2011, for corresponding European Application No. EP 11 16 3150.

English-language communication and Annex to the European Search Report dated Feb. 9, 2011, for corresponding European Application No. 11 16 3150.

European Search Report issued Dec. 5, 2011 in The Hague for corresponding European patent application No. EP 11 16 3150.

* cited by examiner

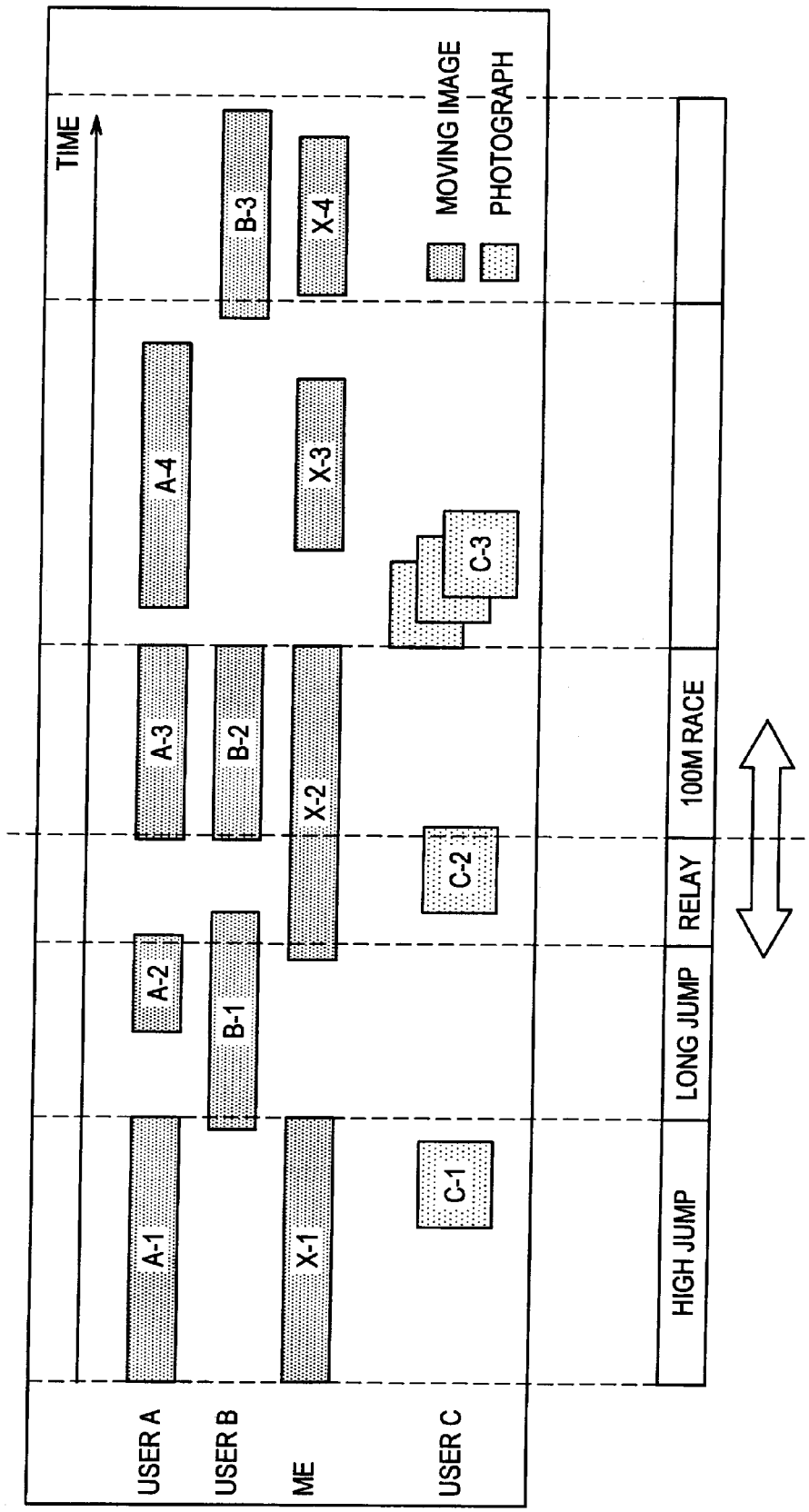

INFORMATION PROCESSING APPARATUS, INFORMATION PROCESSING METHOD, AND PROGRAM

BACKGROUND

The present disclosure relates to an information processing apparatus, an information processing method, and a program.

In recent years, digital video cameras, various portable electronic devices having moving image shooting function, and the like have been in widespread use, and anyone can easily shoot a video. For example, in events such as a wedding party and a sports day, there are many occasions where videos such as a moving image and a still image are shot by those who are present.

On the other hand, services of sharing a shot video are also in widespread use. For example, in JP 2007-249821A, there is suggested a content sharing system in which pieces of content automatically classified into different events based on position information and time information can be shared between users.

SUMMARY

The shot video can be made into attractive content by deleting data which is unsuccessful in shooting such as defocusing and by performing editing such as adding visual effects. However, there was an issue that a video shot by one person was inclined to be monotonous, since the video could only be shot from one viewpoint during the same time period. Further, when a person who shoots the video fails in shooting, the video of that time period becomes missing.

In the light of the foregoing, it is desirable to provide an information processing apparatus, an information processing method, and a program, which are novel and improved, and which are capable of editing moving image using, as materials, videos shot by multiple imaging devices.

According to an embodiment of the present disclosure, there is provided an information processing apparatus which includes a video acquisition section which acquires videos related to a predetermined theme shot by a plurality of imaging devices, a display control section which controls a display of a moving image editing screen including a video selection screen in which the videos acquired by the video acquisition section are arranged on a time axis based on a shooting time of each of the videos, and a moving image generation section which generates a moving image from the videos based on operation performed by a user to the moving image editing screen.

According to the above configuration, the moving image can be generated based on the videos related to the predetermined theme shot by the plurality of imaging devices. In this case, there is provided the video selection screen in which multiple videos related to the predetermined theme are arranged on a time axis based on the shooting time. According to such a screen, since the videos are arranged on the time axis based on the shooting time, the relationship between respective videos based on the shooting time can be intuitively recognized, and comparison between the respective videos becomes easier.

Further, the information processing apparatus may further include a template acquisition section which acquires a template that is a model for creating a moving image based on operation performed by a user.

Further, the information processing apparatus may further include a template generation section which generates the template based on a shooting time of each of the videos acquired by the video acquisition section.

Further, the template generation section may generate a template by extracting a scene break in the template based on a start time and an end time of the videos.

Further, the moving image editing screen may further include a template display screen that displays the template. The display control section may control a display of the moving image editing screen including a video selection screen in which the videos each having a shooting time corresponding to a selected part of a time axis within a template displayed on the template display screen are arranged on a time axis based on a shooting time of each of the videos.

Further, the moving image generation section may search for a video from among the videos based on a search key, and may cause the video selection screen to display the video extracted by the search.

Further, the video selection screen may be a screen in which the video is placed based on information of a position at which the video is shot and information of a direction in which the video is shot.

Further, the videos related to the predetermined theme may represent a plurality of videos shared within a community created based on the predetermined theme.

Further, the videos related to the predetermined theme may represent a plurality of videos shared within a community created based on a shooting location of the videos.

Further, the videos may include a plurality of videos shared within the community and a video stored in a storage section provided inside the information processing apparatus.

Further, the video selection screen may have a horizontal axis, which represents a time axis, and a vertical axis, and a video displayed on the video selection screen may be changed according to change of a granularity of the horizontal axis and/or a granularity of the vertical axis.

According to another embodiment of the present disclosure, there is provided an information processing method which includes acquiring videos related to a predetermined theme shot by a plurality of imaging devices, displaying a moving image editing screen including a video selection screen in which the videos acquired in the video acquisition step are arranged on a time axis based on a shooting time of each of the videos, and generating a moving image from the videos based on operation performed by a user to the moving image editing screen.

According to another embodiment of the present disclosure, there is provided a program for causing a computer to function as an information processing apparatus which includes a video acquisition section which acquires videos related to a predetermined theme shot by a plurality of imaging devices, a display control section which controls a display of a moving image editing screen including a video selection screen in which the videos acquired by the video acquisition section are arranged on a time axis based on a shooting time of each of the videos, and a moving image generation section which generates a moving image from the videos based on operation performed by a user to the moving image editing screen.

According to the embodiments of the present disclosure described above, there can be provided the information processing apparatus, the information processing method, and the program, which are capable of editing moving image using, as materials, videos shot by multiple imaging devices.

BRIEF DESCRIPTION OF THE DRAWINGS

FIG. 27 is an explanatory diagram showing an example of template generation.

DETAILED DESCRIPTION OF THE EMBODIMENT(S)

Figure 1:
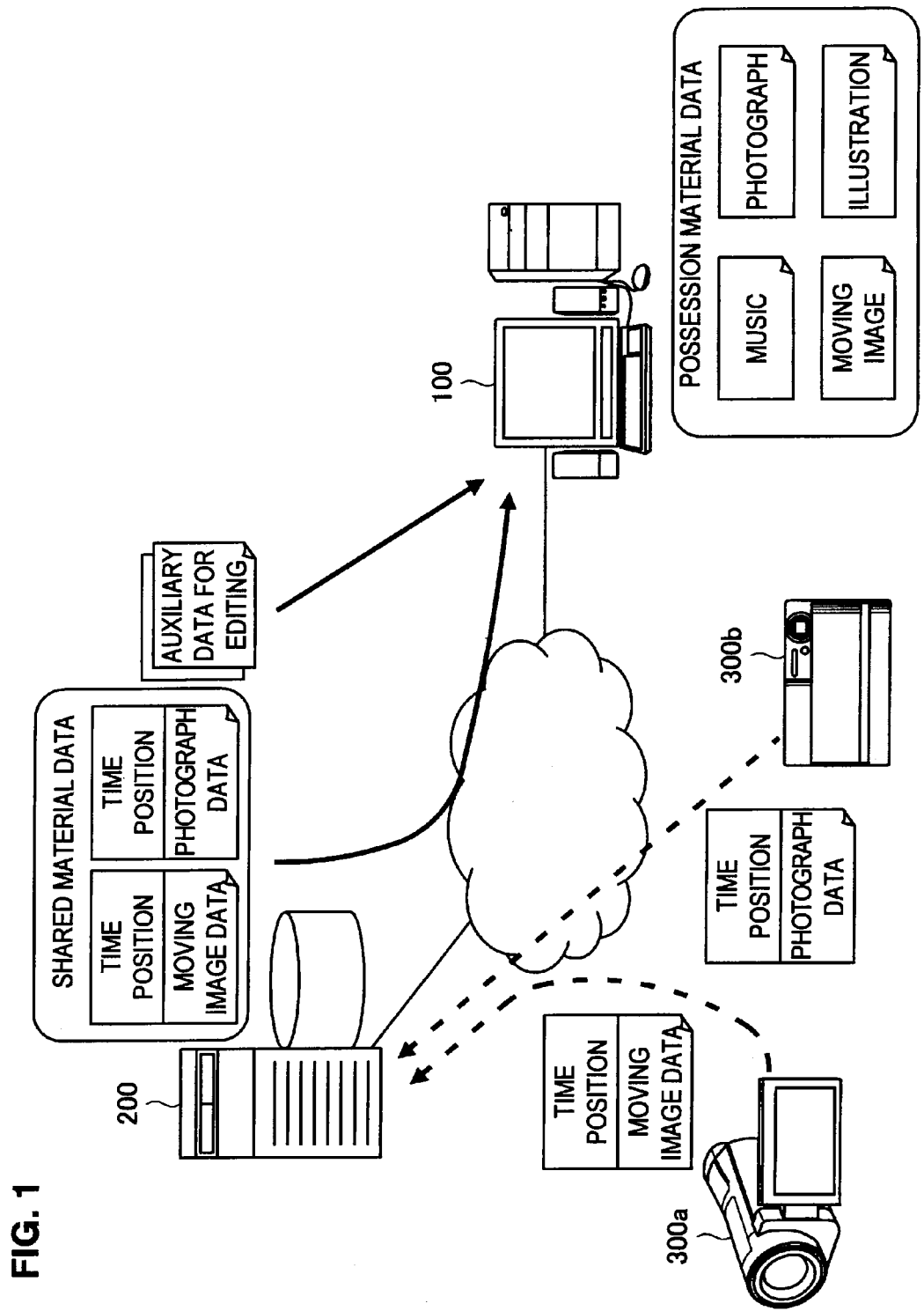
FIG. 1 is a configuration diagram of an example of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Outline
2. Functional configuration
3. Operation
4. Screen example
5. Template generation
6. Examples of effects <1. Outline>

First, with reference to FIG. 1, an outline of an information processing system according to the present embodiment will be described. FIG. 1 is a configuration diagram of an example of an information processing system according to an embodiment of the present disclosure.

As described above, it is becoming common to perform moving image editing for showing a video shot by using an imaging device to other people or for self-enjoyment. Consequently, various services for simplifying the moving image editing for general users, which necessitated expert knowledge in the past, are currently being offered. However, the services for the moving image editing which are currently being offered generate a moving image by using video materials that a user himself/herself has shot.

In this case, since there is only a video shot from one viewpoint, it is difficult to make content of high quality. For example, in most occasions, a person who commercially produces a video uses multiple imaging devices and shoots the same scene from multiple viewpoints, and puts together videos shot from the multiple viewpoints, thereby producing one moving image. It is difficult for a general user to perform shooting using multiple imaging devices. However, for example, in events such as a wedding party and a sports day, it is highly possible that multiple participants each shoot a video. It is considered that a moving image more varied and interesting can be created when there is performed moving image editing using, as materials, multiple videos obtained from multiple participants.

As the content sharing system described in JP 2007-249821A, it is becoming common to share content itself. However, with most of the content sharing systems, it is possible to simply view or download content. Consequently, the information processing apparatus 100 according to an embodiment of the present disclosure provides a function of producing a moving image using videos shot by multiple imaging devices. In this case, since the videos serving as materials are shot by multiple users, the users who can share the videos utilizing community are limited. Further, the information processing apparatus 100 can use, as materials, among shared videos shot by another person and videos shot by a user, a video shared within the community and a video stored locally on the user's apparatus.

Referring to FIG. 1, the information processing apparatus 100 can produce a moving image by using, in addition to possession material data such as music, a photograph, a moving image, and an illustration which are stored locally on a storage section, shared material data and auxiliary data for editing which can be acquired via a network. In this case, the shared material data and the auxiliary data for editing are stored in a community server 200, and are shot by an imaging device 300. Video data serving as shared material data includes moving image data and photograph data, for example, and has time information and position information. The time information and the position information are each an example of metadata added to the video data, and may each be data automatically added to the video data by the imaging device 300 or be metadata set by input performed by a user.

The community server 200 stores shared material data and also manages information of a community. Hereinafter, a creator of the community is referred to as community owner, and a person participated in the community is referred to as community member. The community server 200 provides shared material data, which is shared within the community, in response to an access from a community member. Further, the auxiliary data for editing is a template that is a model for moving image editing, which is shared in a community server, for example.

Figure 2:
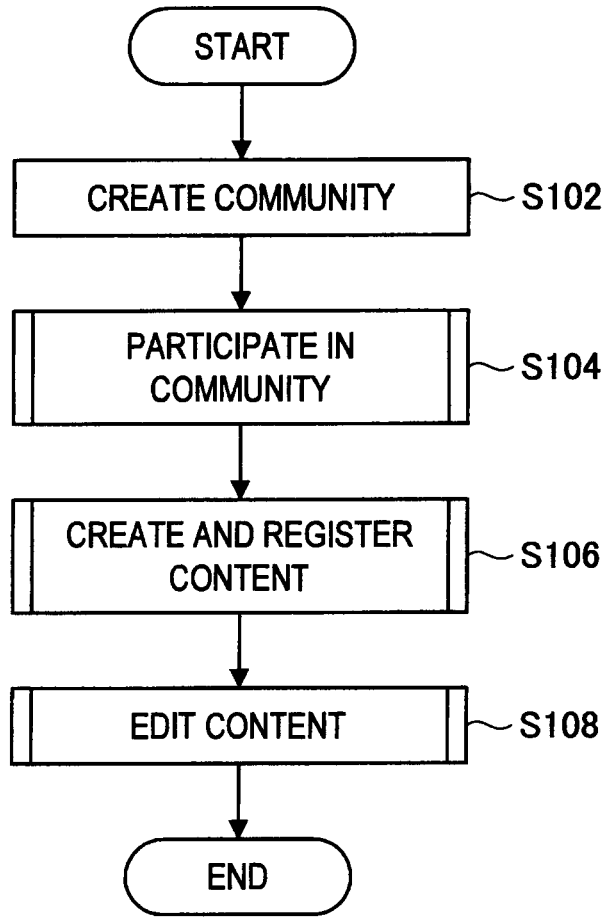
FIG. 2 is a flowchart showing operation of the information processing system according to the embodiment.

Next, with reference to FIG. 2, entire operation of the information processing system according to the present embodiment will be described. FIG. 2 is a flowchart showing the entire operation of the information processing system.

First, the community owner creates a community (S102). For example, the community owner registers key information for specifying the community with a name of the community. Here, an example of creating a community based on a predetermined theme "sports day" will be described. It is desirable that the key information be information capable of specifying the theme. Examples of the key information include position information and time information.

Next, people who participate in the same event participate in the created community (S104). Then, when the participant of the event who has become a community member creates and registers content (S106), the community member edits the content using a video registered by another community member, a video registered by the community member himself/herself, and the possession material data stored locally on the community member's apparatus (S108).

Figure 3:
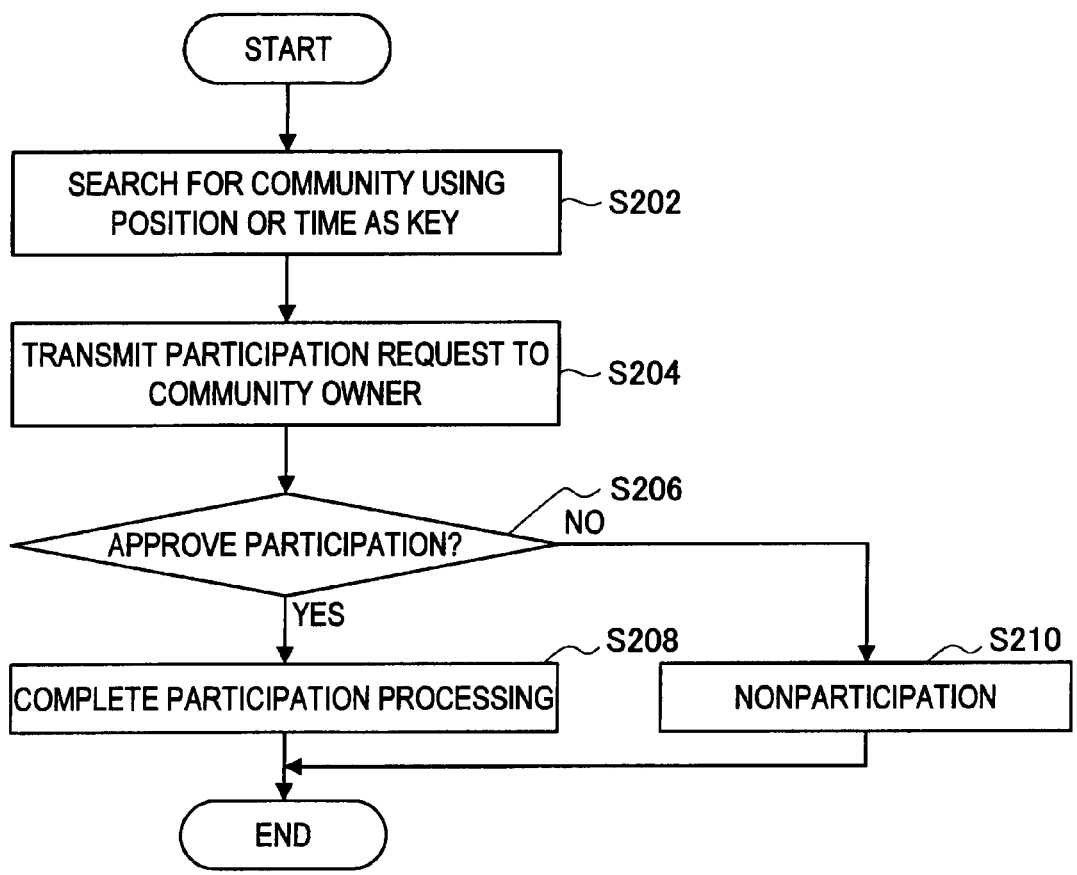
FIG. 3 is a flowchart showing operation of participating in a community according to the embodiment.

Here, with reference to FIG. 3, detailed operation of community participation step, which is shown in Step S104 of FIG. 2 will be described. FIG. 3 is a flowchart showing operation of participating in a community.

A person who wants to participate in a community searches for a community using a position or time as a key (S202). When the person wanting to participate in a community finds a community that the person wants to participate in, the person transmits a participation request to a community owner (S204). When receiving the participation request, the community owner determines whether or not to approve the participation (S206).

In Step S206, when the community owner determines to approve the participation in response to the participation request and performs approval processing, the community server 200 registers the member as a community member, and completes the participation processing (S208).

On the other hand, in Step S206, when the community owner determines not to approve the participation in response to the participation request and performs approval-rejection processing, the community server 200 performs processing of deciding nonparticipation of the member in the community (S210).

Figure 4:
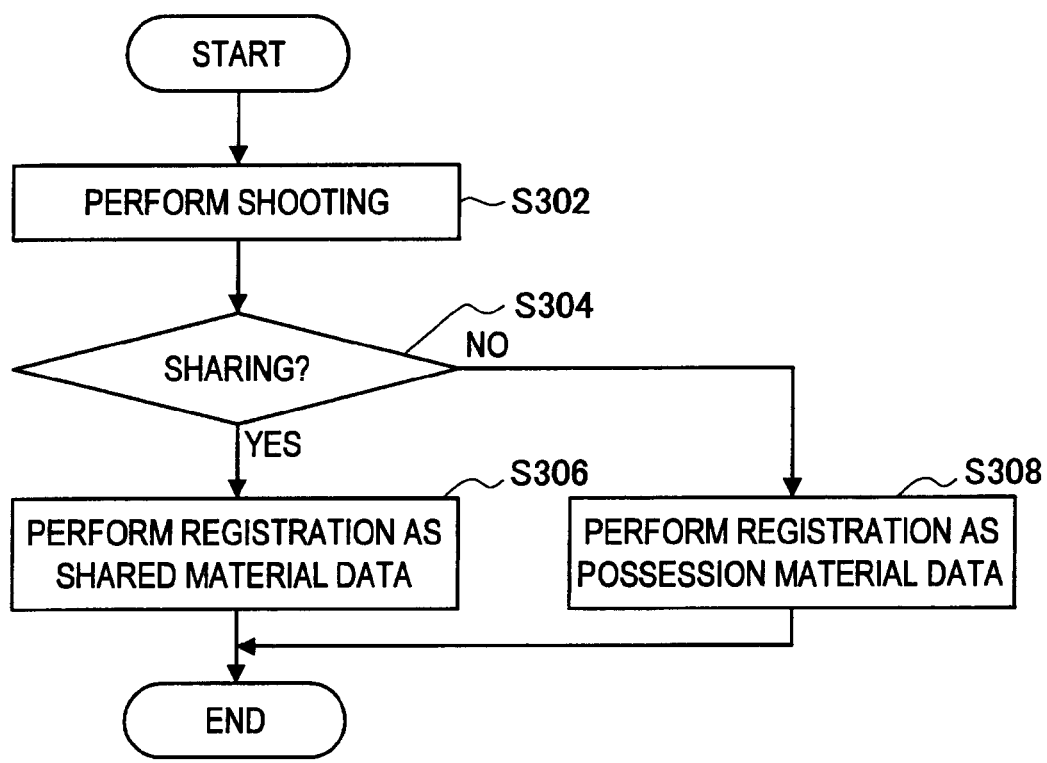
FIG. 4 is a flowchart showing operation of creating and registering content according to the embodiment.

Further, with reference to FIG. 4, detailed operation of content creation and registration step, which is shown in Step S106 of FIG. 2 will be described. FIG. 4 is a flowchart showing operation of creating and registering content.

First, the community member performs shooting using the imaging device 300 (S302). In the present embodiment, the community member shoots a video such as a photograph and a moving image in the sports day. When the community member imports a shot video into the information processing apparatus 100, whether or not to share the video within the community is determined (S304). Then, when determining in the determination of Step S304 that the video is to be shared, the community member registers the video as shared material data in the community server 200 (S306). On the other hand, when the community member determines in the determination of Step S304 that the video is not to be shared, the community member registers locally the video as possession material data in a storage section (S308).

Heretofore, in the information processing system according to the present embodiment, there have been described each of the community creation processing, the community participation processing, and the content creation and registration processing. When the creation and registration of content is completed, the community member uses the registered content as a material and edits the content, and hence, can generate a moving image. Next, the moving image generation processing will be described. For describing the moving image generation processing, first, a functional configuration of an information processing apparatus which performs the moving image generation processing will be described below.

<2. Functional Configuration>

Figure 5:
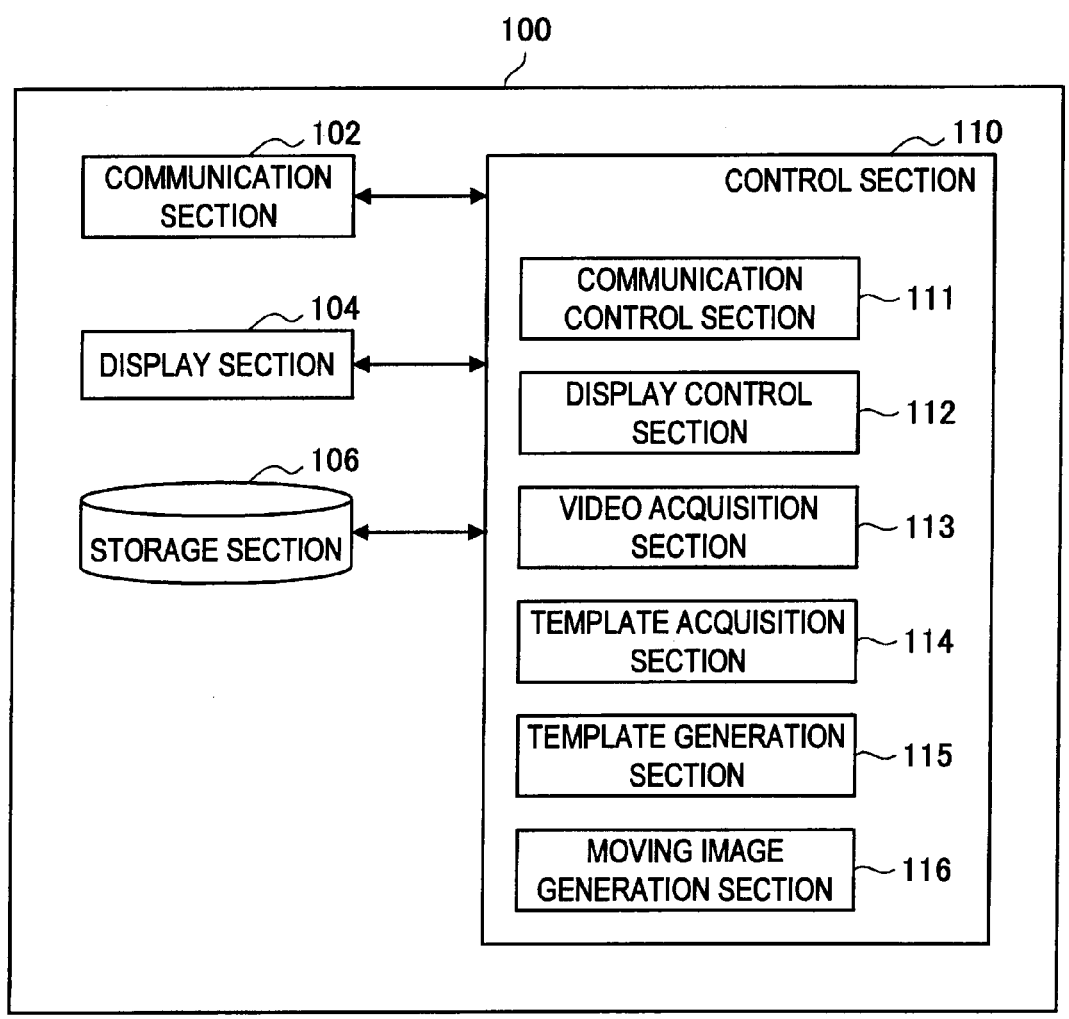
FIG. 5 is a functional configuration diagram of an information processing apparatus according to the embodiment.

Here, with reference to FIG. 5, a functional configuration of an information processing apparatus will be described. FIG. 5 is the functional configuration diagram of the information processing apparatus.

An information processing apparatus 100 according to the present embodiment is an apparatus having a function of performing editing using, as materials, a video shared in a community and a video held locally in a storage section, and generating a moving image. The information processing apparatus 100 mainly includes a communication section 102, a display section 104, a storage section 106, and a control section 110. The control section 110 mainly functions as a communication control section 111, a display control section 112, a video acquisition section 113, a template acquisition section 114, a template generation section 115, and a moving image generation section 116.

The communication section 102 is an interface for communicating with an external device. The communication section 102 connects with the external device in accordance with control of the communication control section 111, and performs data transmission/reception processing. The communication section 102 is a wired or wireless interface, and connects with the community server 200, for example. Alternatively, the communication section 102 may function as an interface for connecting with the imaging device 300, and the information processing apparatus 100 retrieves a video from the imaging device 300 via the communication section 102.

The display section 104 is configured from, for example, a liquid crystal display (LCD) device, an OLED (Organic Light Emitting Diode) device, and a CRT (Cathode Ray Tube) display device. The display section 104 displays various types of information such as a video and a text in accordance control of the display control section 112.

The storage section 106 is a device for storing data, and can include a storage medium, a recording device for recording data in the storage medium, a reading device for reading out the data from the storage medium, and a deletion device for deleting the data recorded in the storage medium. Here, examples of the storage medium include, but are not limited to, a magnetic recording medium such as an HDD (Hard Disk Drive), and a non-volatile memory such as an EEPROM (Electronically Erasable and Programmable Read Only Memory), a flash memory, an MRAM (Magnetoresistive Random Access Memory), a FeRAM (Ferroelectric Random Access Memory), and a PRAM (Phase change Random Access Memory). The storage section 106 stores a program which the control section 110 executes and various types of data including video data to be used for moving image generation.

The control section 110 is a control device which controls entire operation within the information processing apparatus 100 in accordance with various programs. As described above, the control section 110 mainly functions as the communication control section 111, the display control section 112, the video acquisition section 113, the template acquisition section 114, the template generation section 115, and the moving image generation section 116.

The communication control section 111 controls the communication section 102 and controls the communication with another device. The communication control section 111 connects with the community server 200 and acquires a video shared within the community in response to a request from the video acquisition section 113, for example. Further, when the imaging device 300 is connected with the communication section 102, the communication control section 111 receives video data of the imaging device 300. Alternatively, the communication control section 111 transmits moving image data generated by the moving image generation section 116 to the community server 200 in response to a request of the moving image generation section 116.

The display control section 112 has a function of controlling a screen to be displayed on the display section 104. For example, the display control section 112 generates a template generation screen in response to a request of the template generation section 115, and causes the display section 104 to display the template generation screen. Alternatively, the display control section 112 generates a moving image editing screen in response to a request of the moving image generation section 116, and causes the moving image editing screen to be displayed on the display section 104.

The video acquisition section 113 acquires video data serving as a material for generating a moving image. The video acquisition section 113 acquires a video among shared material data, which is shared within the community, from the community server 200 via the communication section 102, for example. Further, the video acquisition section 113 acquires a video serving as possession material data stored in the storage section 106 provided inside the information processing apparatus 100. Alternatively, the video acquisition section 113 acquires a video from the imaging device 300 connected with the communication section 102.

The template acquisition section 114 acquires a template to be a model for moving image generation. The template acquisition section 114 acquires a template which is provided mainly by the community server 200. Alternatively, in the case where the information processing apparatus 100 has template data in the storage section 106 provided inside the information processing apparatus 100, the template acquisition section 114 may acquire a template from the storage section 106 provided inside the information processing apparatus 100. Further, the template acquisition section 114 may acquire a template generated by the template generation section 115.

The template generation section 115 generates a template to serve as a model for the moving image generation. The template generation section 115 generates the template based on video data which is a material for the moving image generation. For example, the template generation section 115 generates the template based on metadata added to the video data. The details on the template generation operation will be described below.

The moving image generation section 116 generates moving image content by performing editing using, as materials, a video shared within the community and a video stored in the storage section 106 included in the information processing apparatus 100. Further, the moving image generation section 116 generates the moving image content using the template acquired by the template acquisition section 114. The video editing processing performed in the moving image generation section 116 will be described below.

<3. Moving Image Editing Operation>

Figure 6:
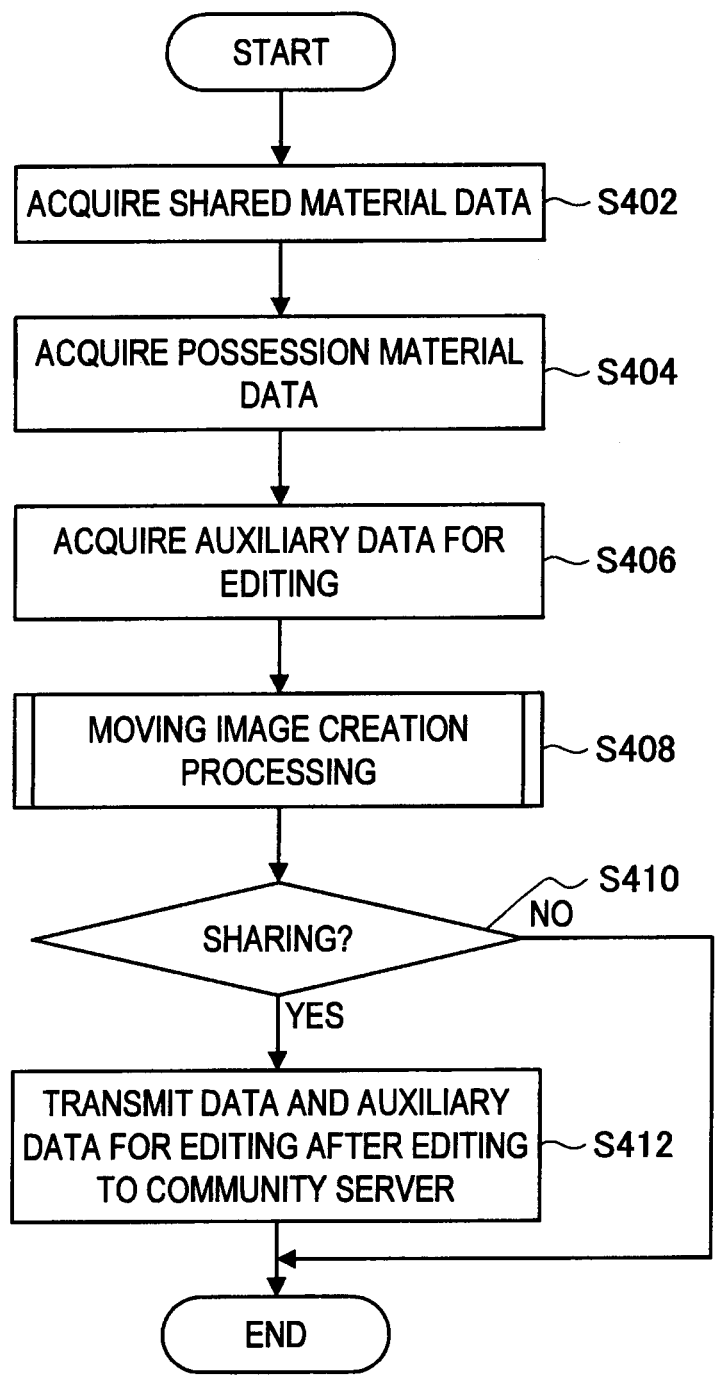
FIG. 6 is a flowchart showing content editing operation of the information processing apparatus according to the embodiment.
Figure 7:
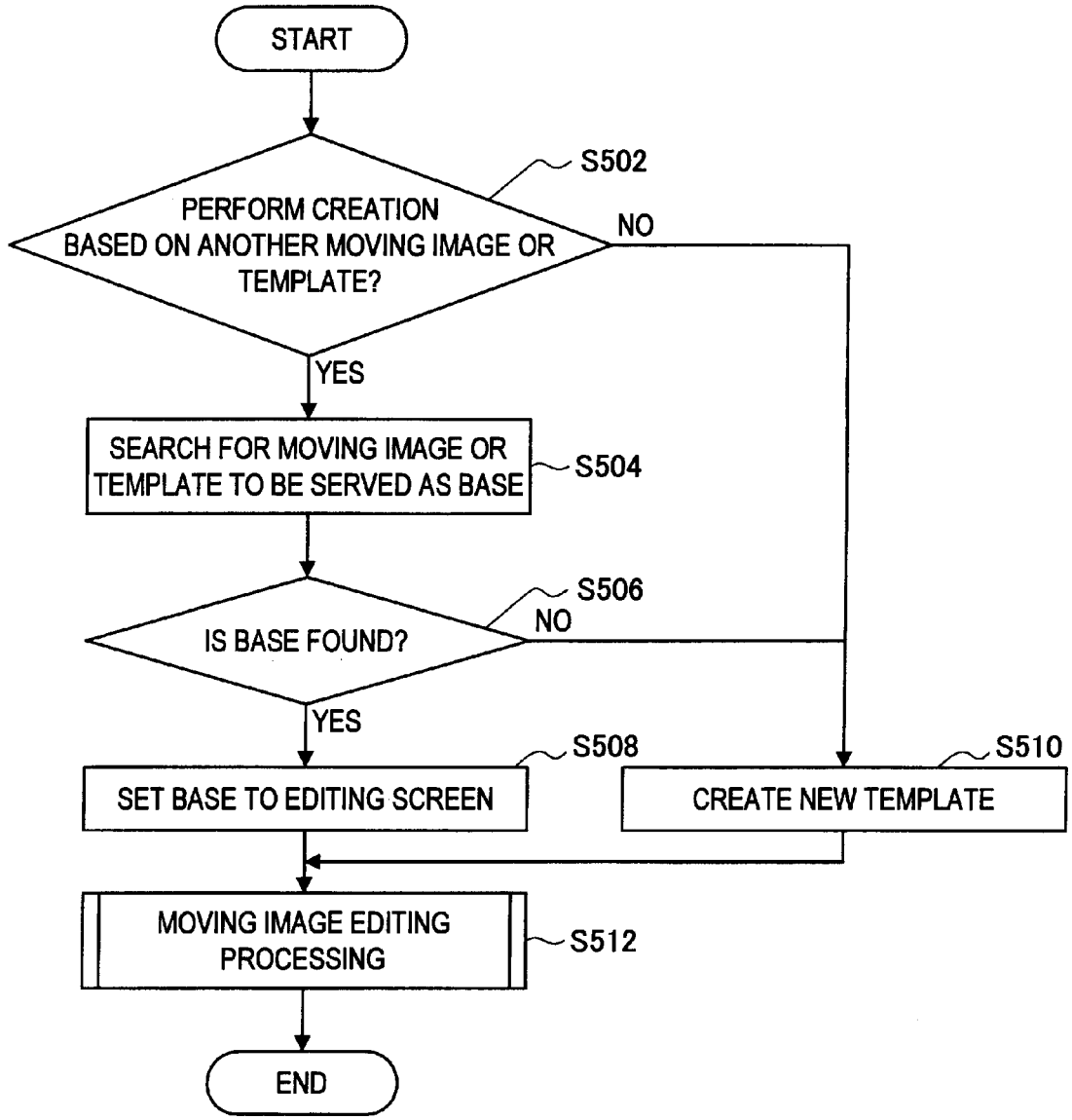
FIG. 7 is a sub-flowchart of moving image creation processing of FIG. 6.
Figure 8:
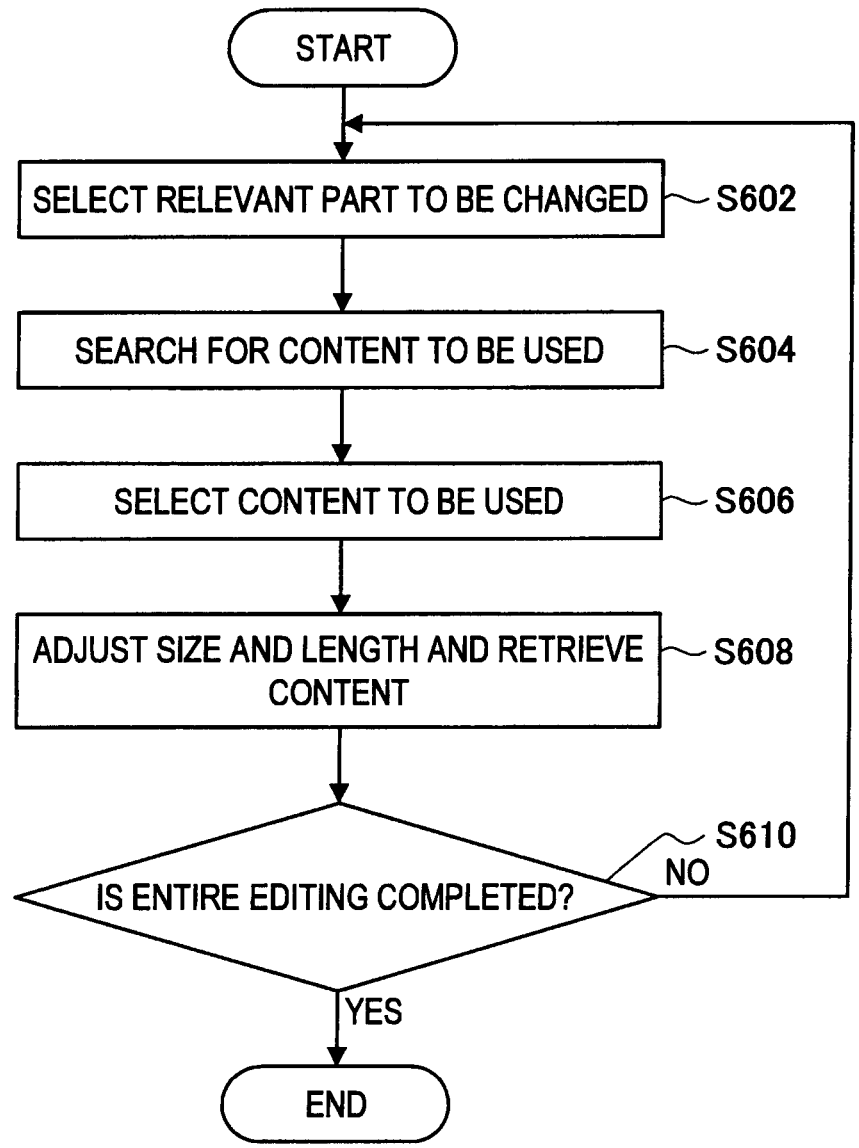
FIG. 8 is a sub-flowchart of moving image editing processing of FIG. 7.

Next, with reference to FIGS. 6 to 8, moving image editing operation in the information processing apparatus 100 will be described. FIG. 6 is a sub-flowchart of Step S108 of FIG. 2, and is a flowchart showing content editing operation. FIG. 7 is a sub-flowchart of Step S408 of FIG. 6, and is a flowchart showing moving image creation operation. Further, FIG. 8 is a sub-flowchart of Step S512 of FIG. 7, and is a flowchart showing moving image editing operation.

First, referring to FIG. 6, the video acquisition section 113 of the information processing apparatus 100 acquires shared material data as a material for creating a moving image from the community server 200 (S402). Further, the video acquisition section 113 acquires possession material data as a material for creating the moving image from the storage section 106 of the information processing apparatus 100 (S404). Then, the template acquisition section 114 acquires auxiliary data for editing (S406). Here, the template acquisition section 114 acquires available auxiliary data for editing from the community server 200, for example. Alternatively, when there is auxiliary data for editing held by the information processing apparatus 100 in the storage section 106, the auxiliary data for editing may be acquired from the storage section 106. The auxiliary data for editing is supplementary data used for editing a moving image, and is mainly a template and the like.

Then, the moving image generation section 116 performs moving image creation processing (S408). The moving image creation processing is performed based on the video data and the template acquired in Steps S402 to Step S406. Then, when the moving image content is generated in Step S408, the user determines whether or not to share the generated moving image content and the auxiliary data for editing generated accompanied by the generation of the moving image content (S410). In the determination in Step S410, in the case where the user determines not to perform sharing, the content editing processing is terminated, and, in the determination in Step S410, in the case where the user determines to share the generated moving image content and the auxiliary data for editing, the moving image generation section 116 transmits the moving image content and the auxiliary data for editing after editing to the community server 200 (S412).

Next, with reference to FIG. 7, the details on the moving image creation processing will be described. First, the user determines whether or not to perform the creation based on another moving image or template (S502). The other moving image may be the one previously created by the user or may be the one created by another community member within the community. In the case where the user determines to perform the creation based on another moving image or template, the moving image generation section 116 searches for a moving image or template to be served as a base (S504). The user determines whether or not to create moving image content based on the retrieved moving image or template (S506). That is, in the case of creating the moving image content based on the retrieved moving image or template, it is determined that the base is found.

In the case where a moving image or template serving as a base is found, the base is set to an editing screen (S508), and moving image editing processing is executed in a way that the moving image or the template serving as the base are edited (S512). On the other hand, in the case where, in Step S502, the user determines not to perform the creation based on the moving image or the template serving as the base, or in the case where, in Step S506, the moving image or the template serving as the base is not found, new template creation processing is executed (S510), and after that, moving image editing processing based on the created template is executed.

Next, with reference to FIG. 8, the details on the moving image editing processing will be described. As has been described in FIG. 7, at the time point of starting the moving image editing processing, the previously created moving image or template, or the new template created in Step S510 of FIG. 7 is set as a base. Consequently, first, the user selects a relevant part in the base which the user wants to make a change (S602). Then, search for content to be used for the relevant part is performed (S604). When search results are displayed, the user performs operation for selecting the content to be used from among the search results (S606). The content used here may either be a moving image or a still image. Then, after performing processing of adjusting a size, a length, and the like of the content to be used, the content is retrieved as content to be inserted into the selected changed part (S608). After that, the user determines whether or not the entire editing work has been completed (S610), and in the case of further making a change to another part, the processing from Step S602 to Step S608 is repeated.

Figure 9:
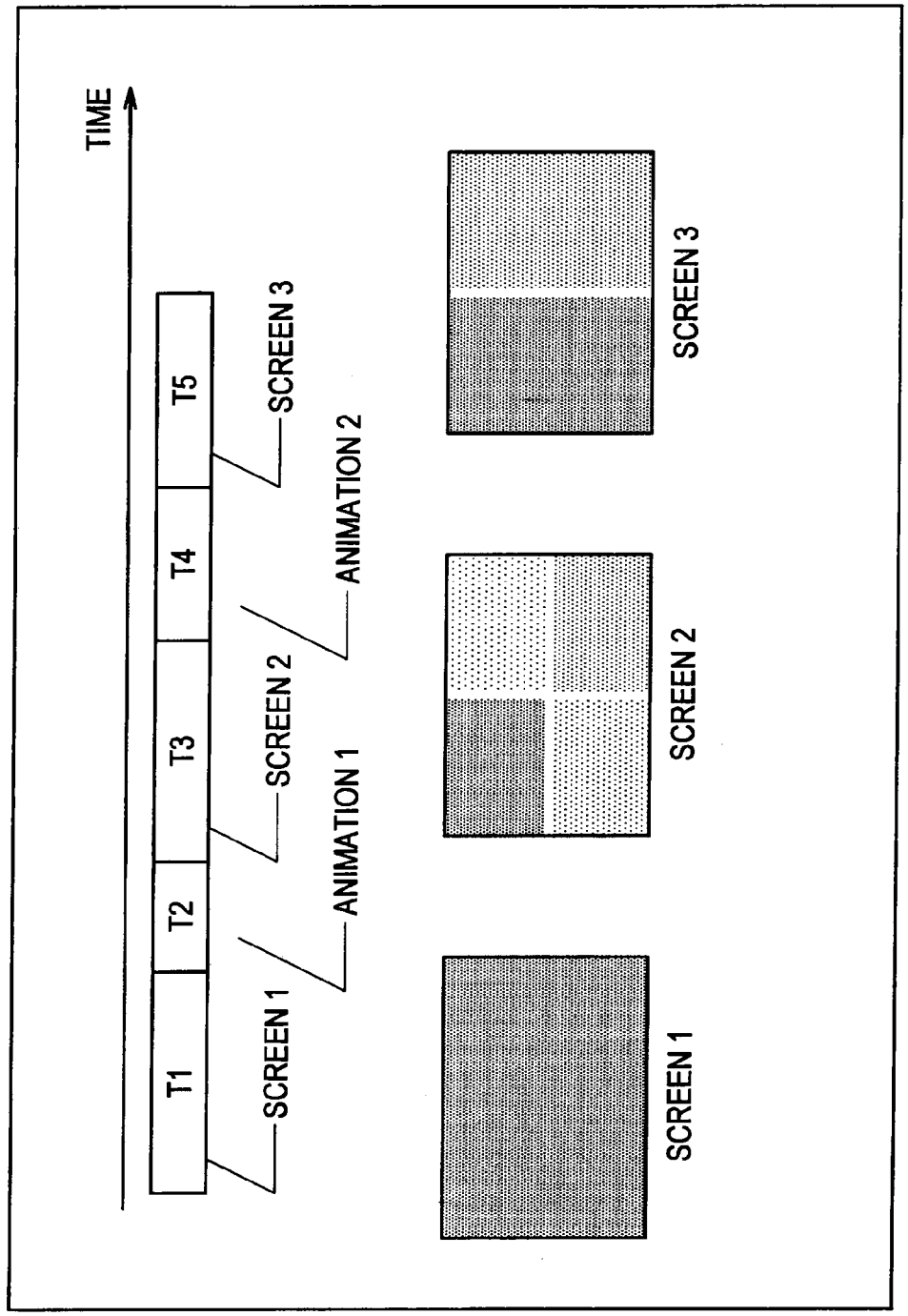
FIG. 9 is an explanatory diagram showing an example of a template.

Note that, the template used in the description above represents the template shown in FIG. 9, for example. FIG. 9 is an explanatory diagram showing an example of the template. For example, the template is a model which defines a way of splitting the screen of the moving image during a time period T1, and which defines a type of animation to be inserted during a time period T2. In the example shown in FIG. 9, the template is defined to use full-screen display during the time period T1, split-screen display of four windows during a time period T3, and split-screen display of two windows during a time period T5. Animation 1 and animation 2 are inserted during the time period T2 and a time period T4, respectively.

<4. Screen Example>

Figure 10:
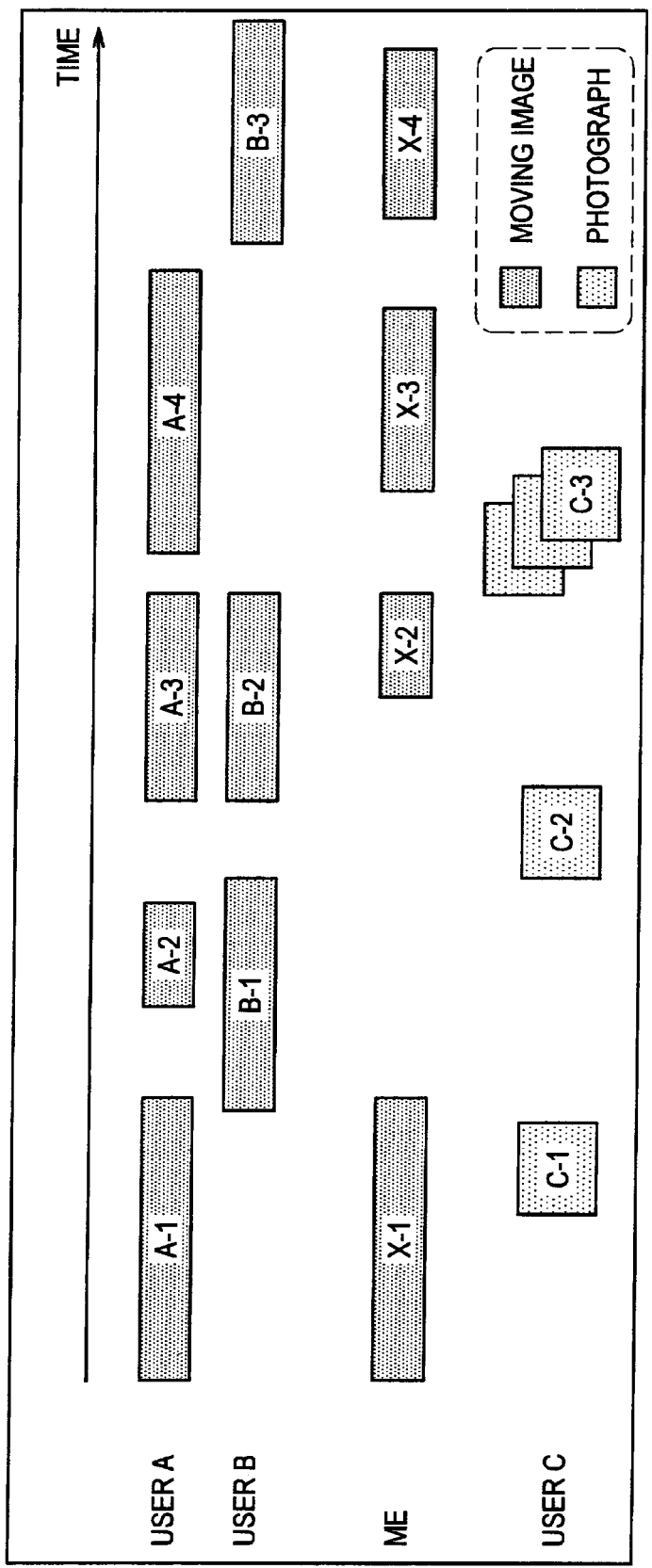
FIG. 10 is an explanatory diagram showing an example of a video selection screen.
Figure 11:
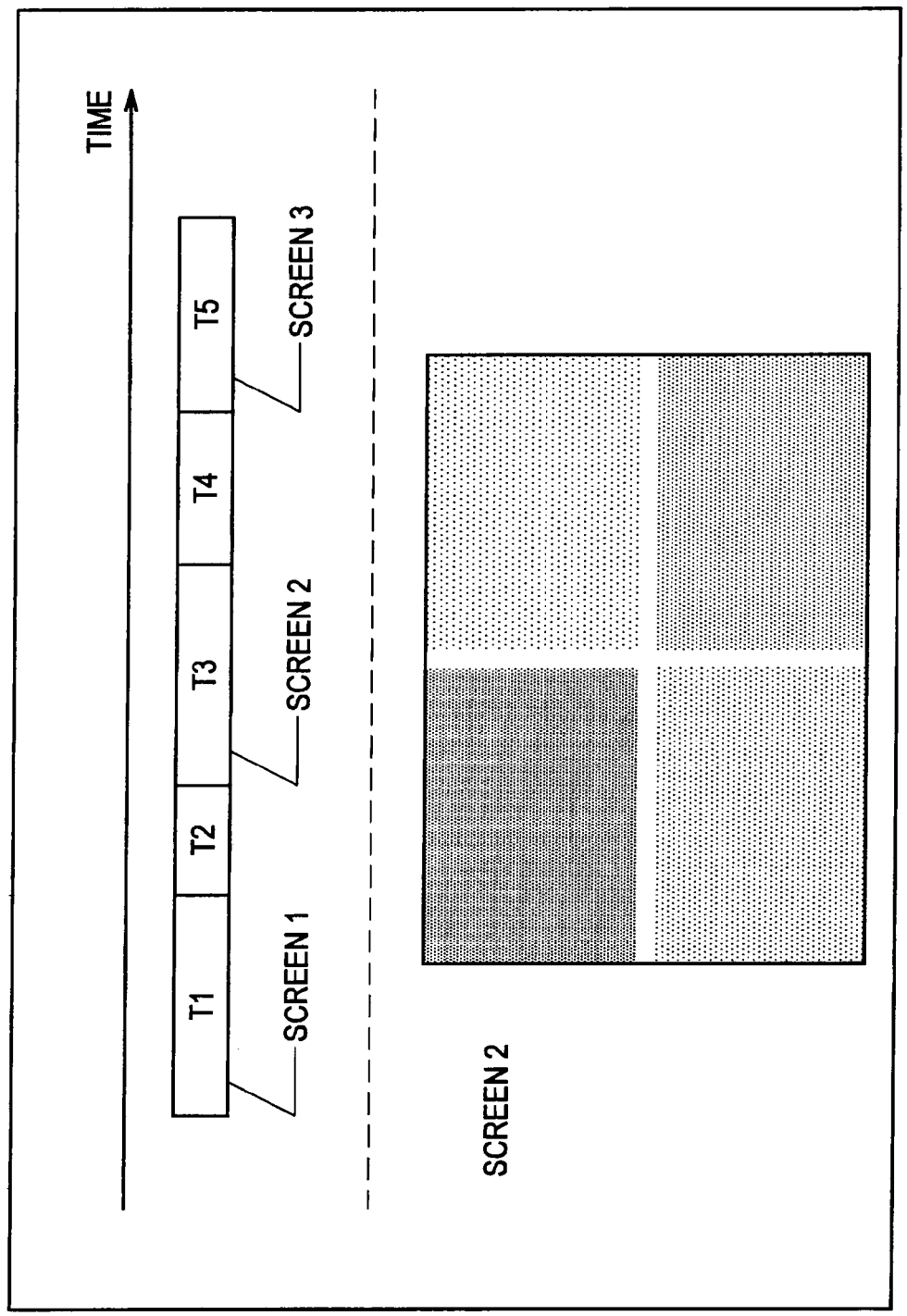
FIG. 11 is an explanatory diagram showing an example of a template display screen.

Next, examples of screens provided by the information processing apparatus 100 will be described with reference to FIGS. 10 to 27. FIG. 10 is an explanatory diagram showing an example of a video selection screen which is a part of a moving image editing screen. FIG. 11 is an explanatory diagram showing an example of a template display screen which is a part of a moving image editing screen.

(Video Selection Screen)

As shown in FIG. 10, videos serving as materials for editing a moving image are arranged on a time axis based on a shooting time of each of the videos. Further, as shown in FIG. 11, when selecting a time period T3 in the template, a split screen during the time period is displayed, and in a screen 2 which is divided into four screens, videos to be displayed in respective screen areas are set by performing drag and drop. Accordingly, with simple operation of selecting a video to be used from among the videos displayed on the time axis and inserting the video into a template, there can be created a varied moving image content.

Figure 12:
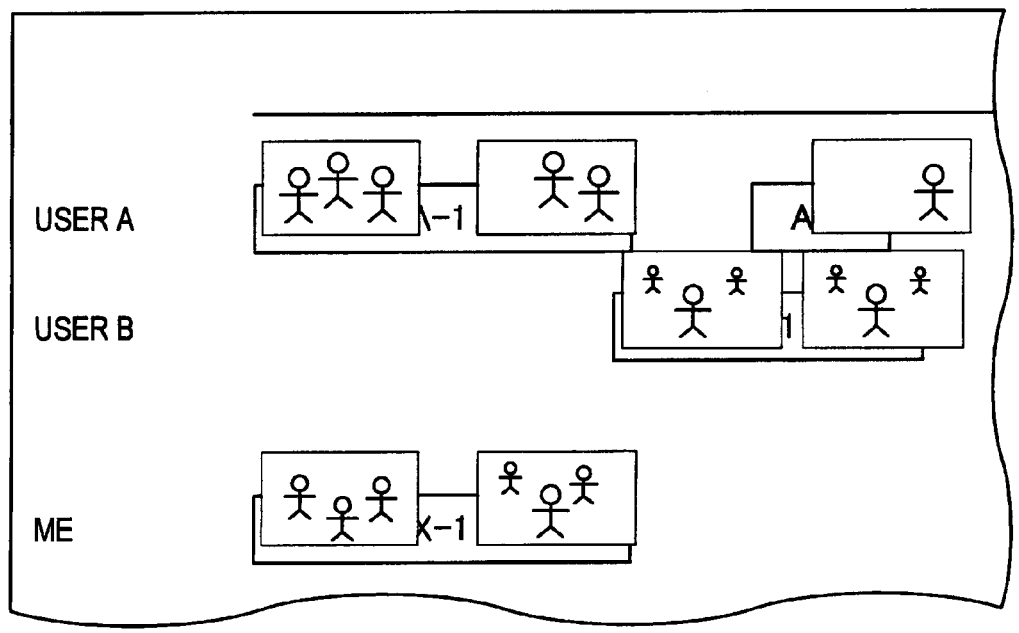
FIG. 12 is an explanatory diagram showing an example of a display of a video selection screen.
Figure 13:
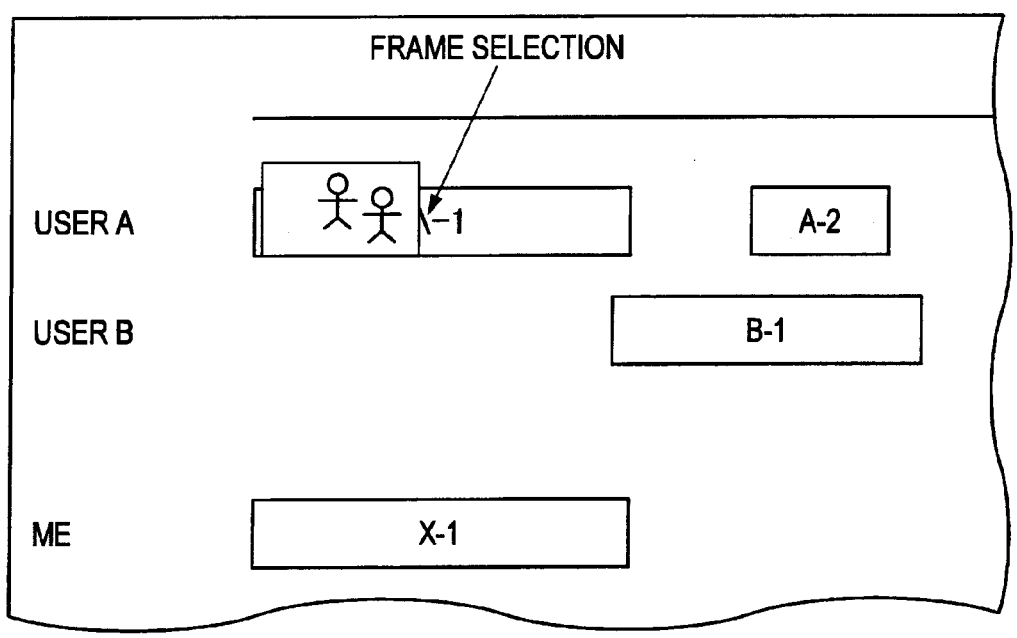
FIG. 13 is an explanatory diagram showing another example of the display of the video selection screen.
Figure 14:
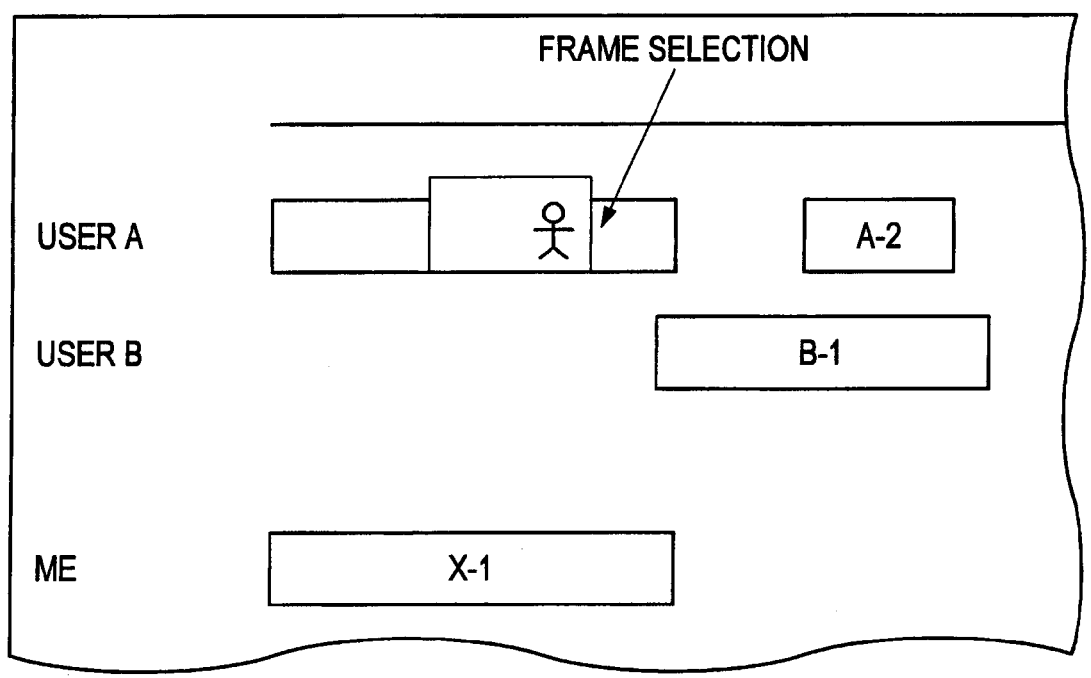
FIG. 14 is an explanatory diagram showing another example of the display of the video selection screen.

As shown in FIG. 12 for example, the video selection screen may be displayed together with an image of a leading frame of each video in order to make the contents of each video more seeable. In this case, when the length of the video is long, multiple thumbnail images may each be displayed in accordance with the length. For example, in the case of displaying two images, there are displayed images of leading frames of the videos, the videos being obtained by dividing the video into two parts. Alternatively, as shown in FIGS. 13 and 14, there may be displayed a thumbnail image corresponding to a selection part of the video selected by the user in the video selection screen.

In the video selection screen described above, the horizontal axis represents time and the vertical axis represents users. The granularity of the axis can be changed. Each time the granularity of the axis is changed, the video to be displayed is also automatically changed. Accordingly, the user can quickly find his/her intended video by causing the video to be displayed at an optimum granularity.

Figure 15A:
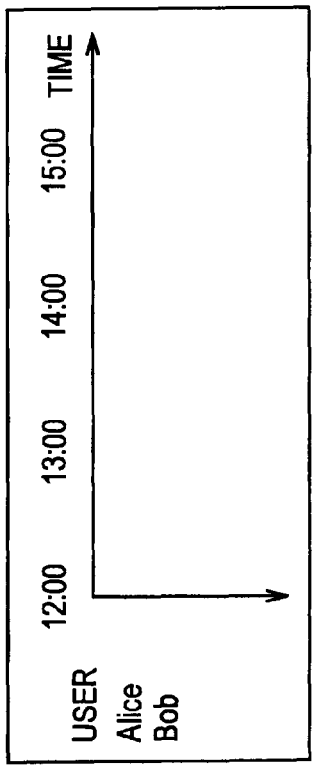
FIG. 15 is an explanatory diagram showing an example of granularity change of an axis of the video selection screen.
Figure 15B:
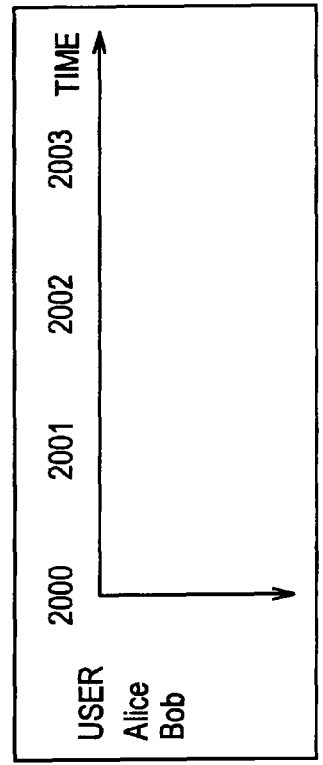
Figure 15C:
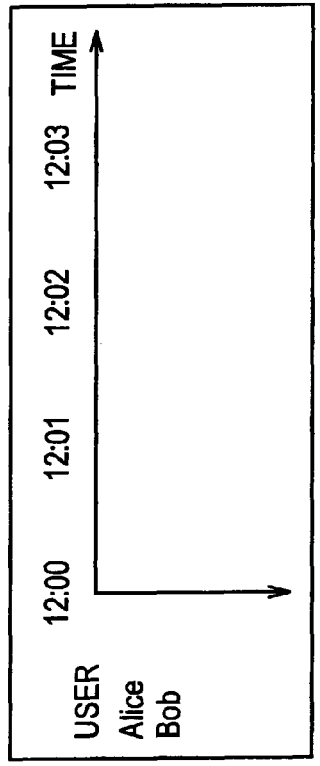
Figure 15D:
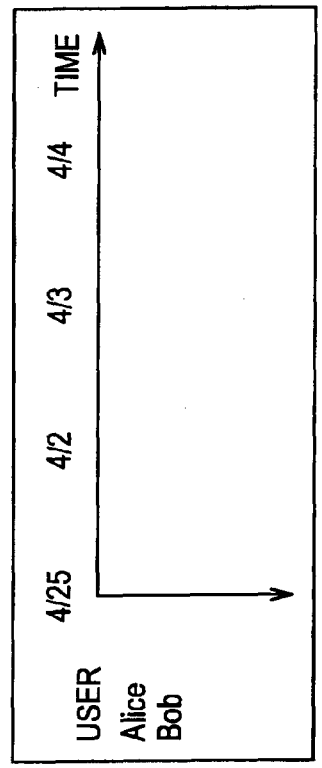
Figure 16B:
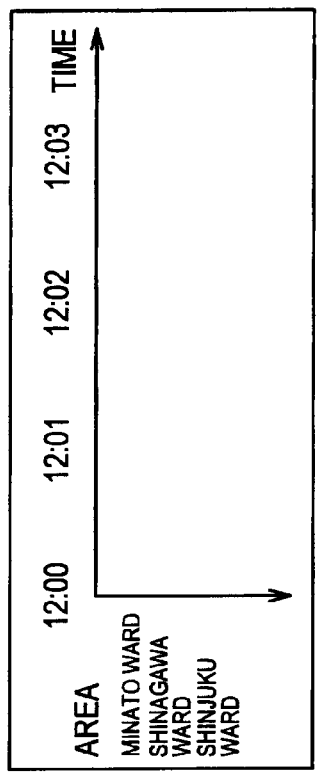
FIG. 16 is an explanatory diagram showing another example of granularity change of an axis of the video selection screen.
Figure 16D:
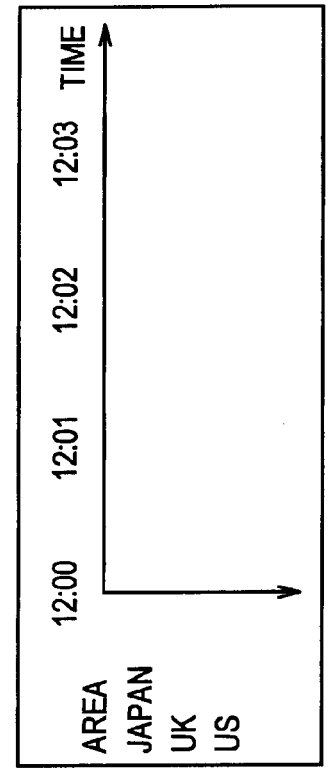
Figure 16A:
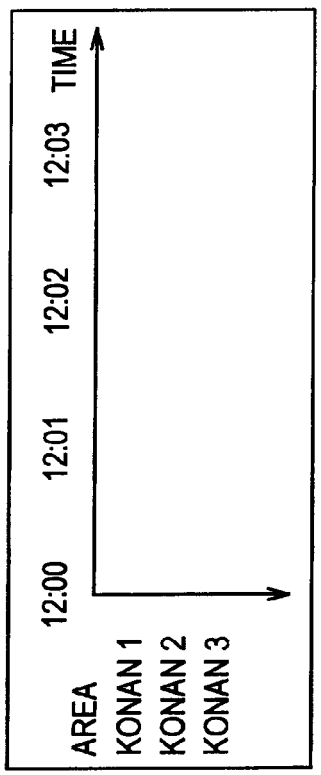
Figure 16C:
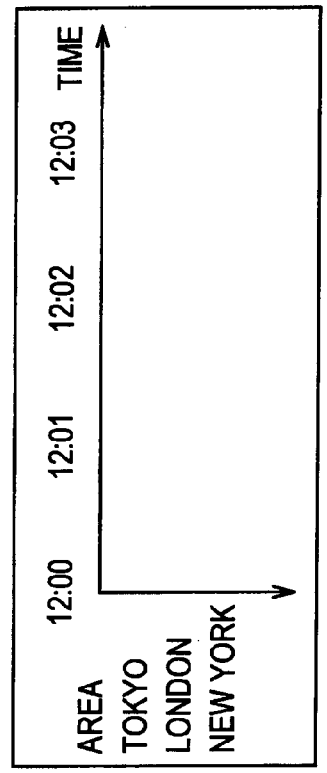

For example, as shown in FIG. 15, the time on the horizontal axis can be changed to the granularities of the second time scale, the minute time scale (FIG. 15A), the hour time scale (FIG. 15B), the day time scale (FIG. 15C), the month time scale, and the year time scale (FIG. 15D). According to such a configuration, it becomes easier to find a desired video by changing the time scale of the axis to a shorter time scale when looking for a video of an event taken place at a certain time point, and by changing the time scale of the axis to a longer time scale when looking for a video of an event taken place on a long-term basis.

Further, the vertical axis can represent a granularity of not only the user unit but also of a geographical point as shown in FIG. 16, for example. The area on the vertical axis represents a shooting location of the video. For example, the granularity of the geographical points can be changed to the block scale (FIG. 16A), the ward scale (FIG. 16B), the city scale (FIG. 16C), and the country scale (FIG. 16D).

(Video Search Screen)

Here, a search method of a video will be described with reference to FIGS. 17 to 20. In order to efficiently find a desired video from among videos serving as materials used as a part of moving image content, the information processing apparatus 100 also provides a video search function. As information to be a search key, there can be exemplified face information, position information, direction information, tag information, and shooting time.

Figure 17:
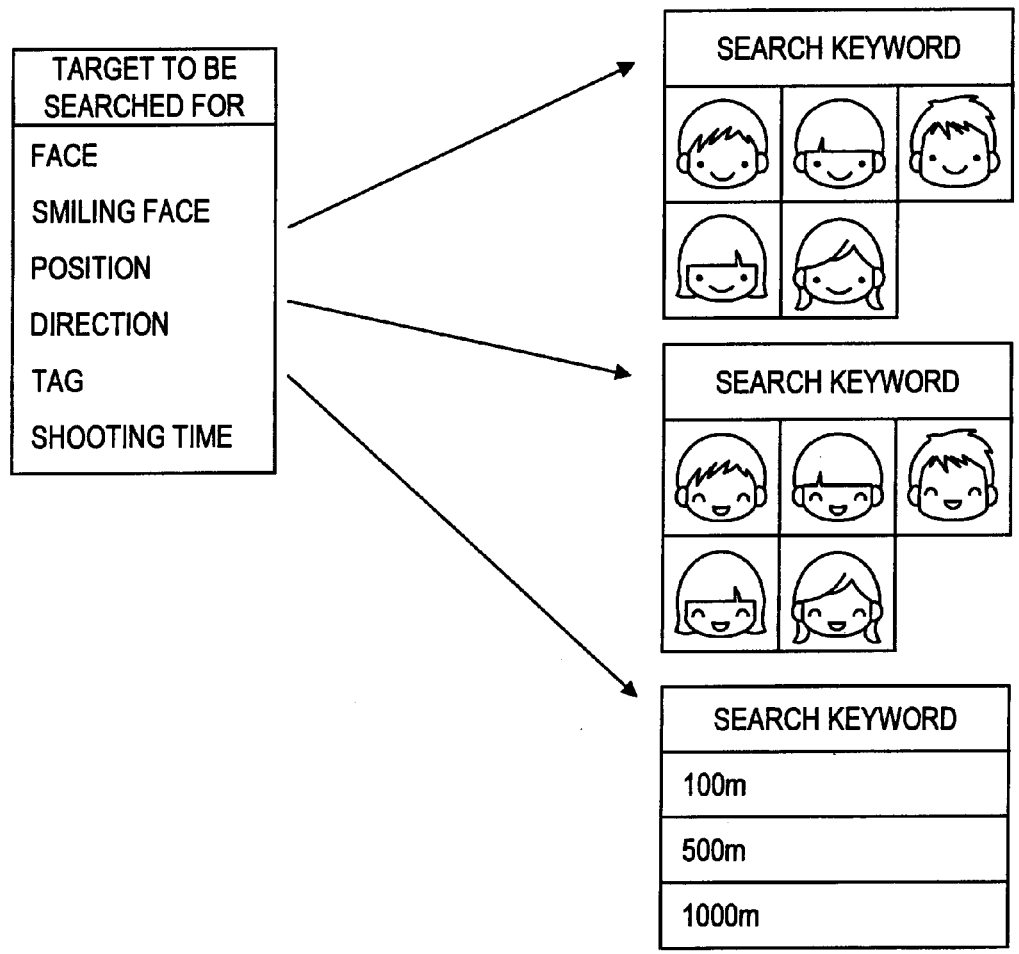
FIG. 17 is an explanatory diagram showing an example of video search.

For example, as shown in FIG. 17, in the case where a face is selected as a target to be searched for, there are displayed all faces included in the video, as shown in the upper right part of FIG. 17. By selecting any one of the faces from among the display of the face list, the user can extract a video including the selected face. Alternatively, in the case where a smiling face is selected as the target to be searched for, there are displayed all smiling faces out of the faces included in the video as shown in the middle right part of FIG. 17.

Further, in the case where a position is selected as the target to be searched for, there are displayed options of radius distances on the basis of the video shot by the user himself/herself, as shown in the lower right part of FIG. 17. By selecting any one of the radius distance from among the options, the user can extract a video shot within the selected radius distance from the video of the user.

Further, in the case where a direction is selected as the target to be searched for, a video can be extracted with a direction on the basis of the video shot by the user himself/herself. Further, a video can be extracted based also on a tag and a shooting time.

Figure 18:
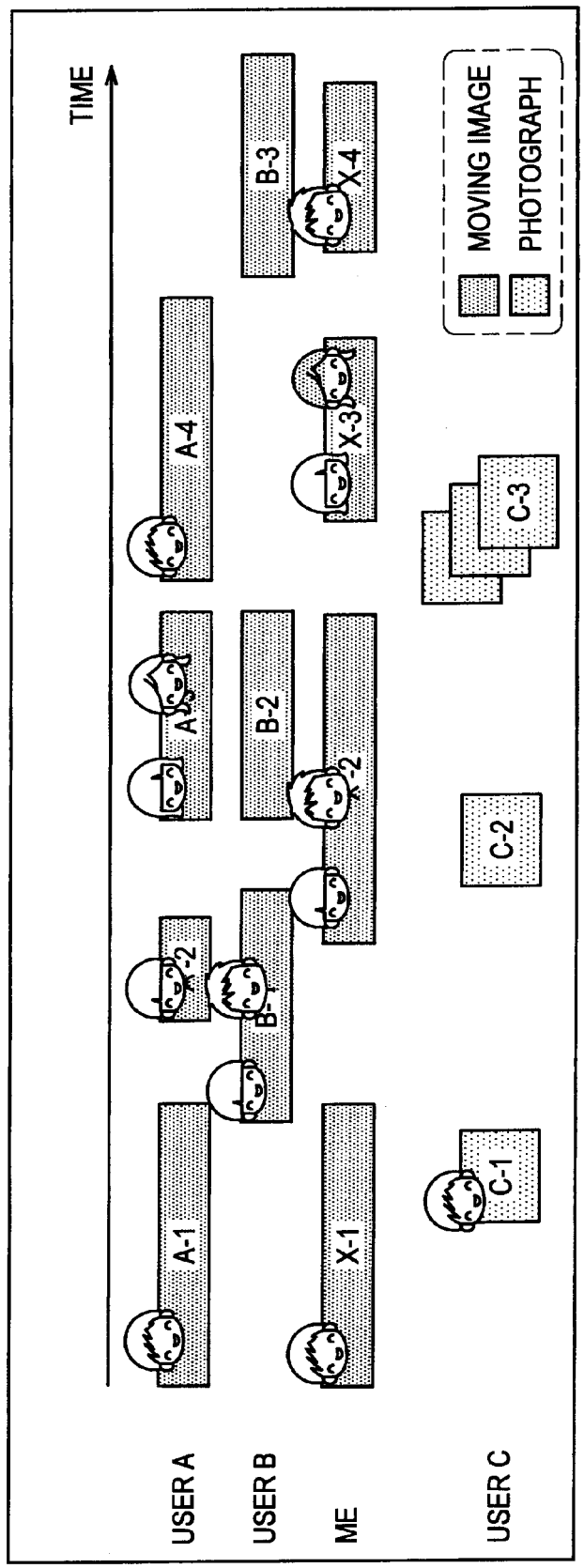
FIG. 18 is an explanatory diagram showing an example of video search.
Figure 19:
FIG. 19 is an explanatory diagram showing an example of video search.
Figure 20:
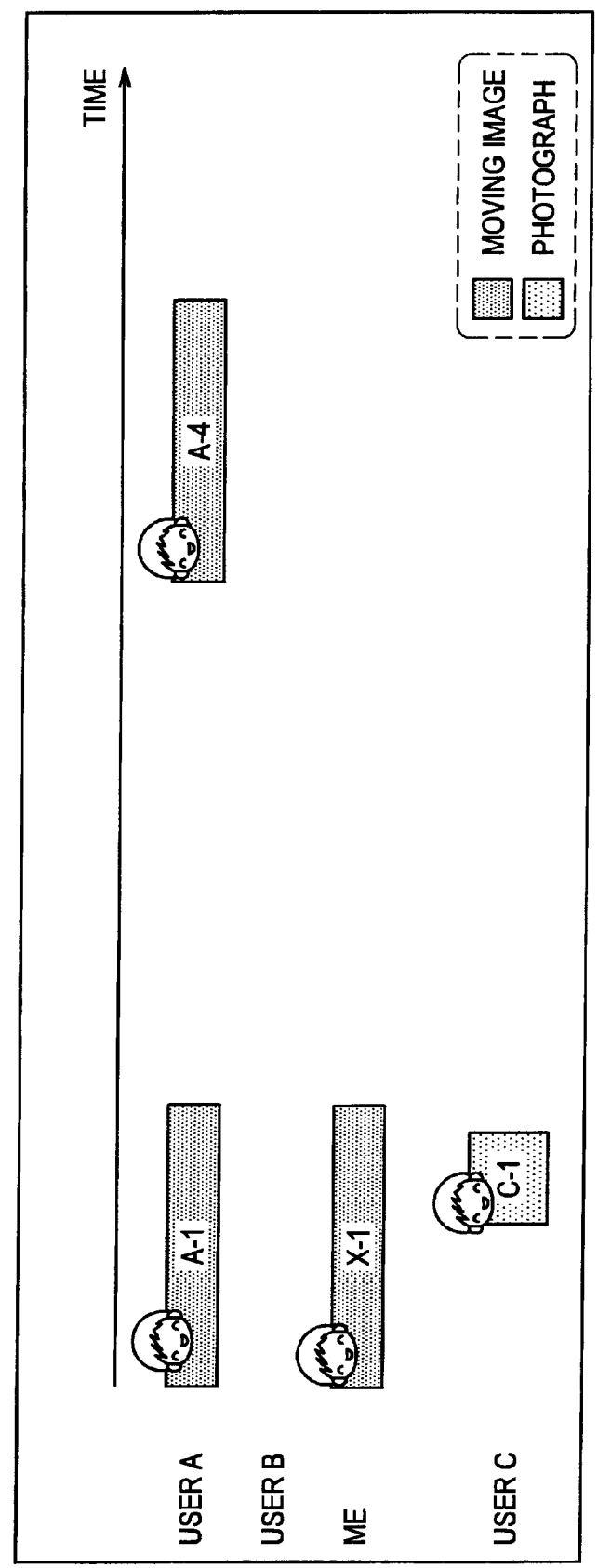
FIG. 20 is an explanatory diagram showing an example of video search.

For example, when the smiling face is selected as the target to be searched for in the search screen of FIG. 17, there are displayed, on the videos of the video selection screen, faces included in the respective videos as shown in FIG. 18. Then, when the user selects a face shown in FIG. 19 in a search keyword selection screen, only the videos each including the selected face are displayed on the video selection screen as shown in FIG. 20.

Figure 21:
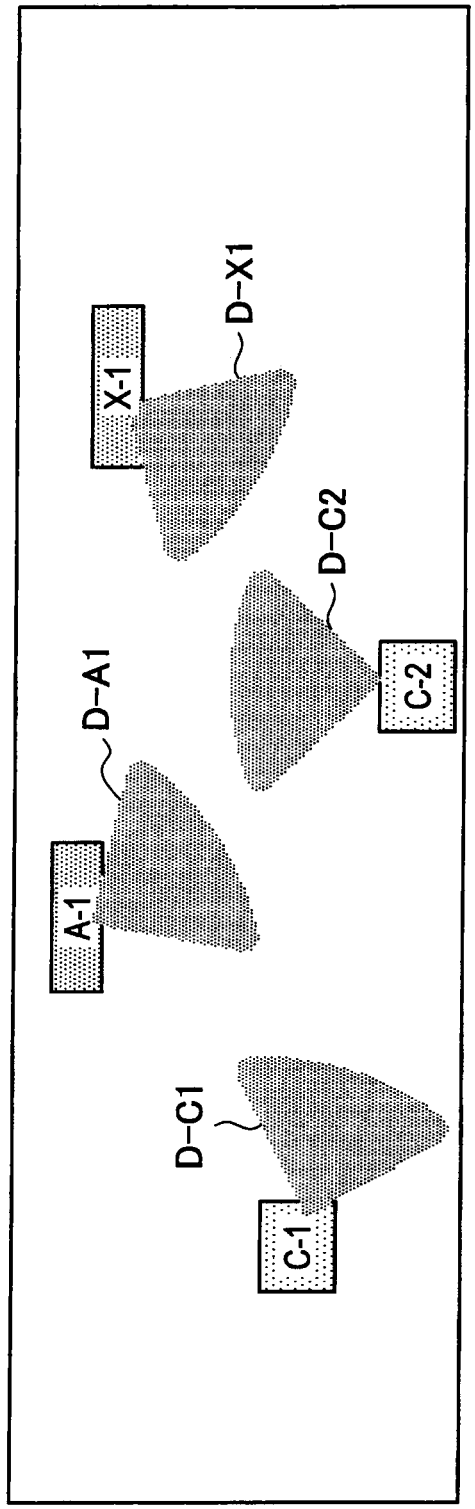
FIG. 21 is an explanatory diagram showing an example of a display of a video selection screen based on a shooting position.

Further, in the case where a position and a direction is selected in the selection of the target to be searched for of FIG. 17, a video selection screen may be displayed as shown in FIG. 21. That is, the horizontal axis of the video selection screen described above represents time, and in this case, however, each video is arranged at a position corresponding to a shooting location based on position information. At that time, it is desirable that direction information D is also displayed. With such a display, the user can intuitively grasp relationships of the positions at which respective videos are shot.

Figure 22:
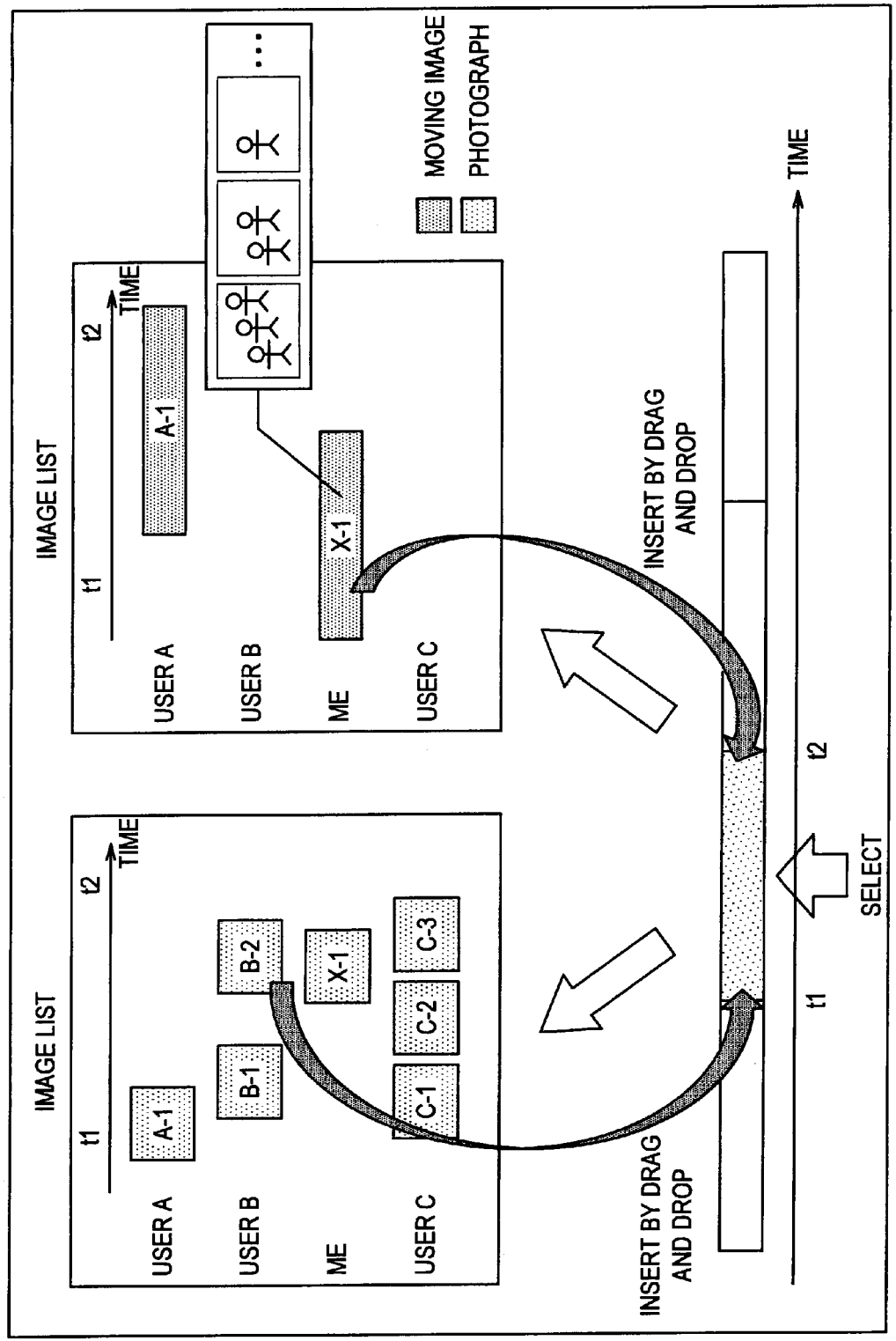
FIG. 22 is an explanatory diagram showing an example of a moving image editing screen.

The moving image editing is performed using the video selection screen and the template display screen described above. For example, the video selection screen and the template display screen are arranged as shown in FIG. 22 in the moving image editing screen. For example, when the user selects a part (time from t1 to t2) that the user wants to change in the template, an available video list is displayed along the time axis in the video selection screen. From among the displayed videos, the video that the user wants to use is inserted into the template by drag and drop operation.

In this case, when the video is inserted by performing drag and drop, in the case where a size of the video differs from a size of a frame, there is displayed a screen for confirming with the user whether to insert the video by enlarging/reducing the size of the video in accordance with the size of the frame or to insert the video in an original size. Such processing is performed in the same manner in the case where the video is a still image and in the case where the video is a moving image.

On the other hand, in the case where the video is a moving image, there can be assumed a case where the length of the video does not fit to the length of the template. There is provided a screen for the user to select a method for adjustment. For example, in the case where the length of the video is longer than the length of the template, there are a method of retrieving only a section from the video and adjusting the length of the video to the length of the template, and a method of extending the length of the template up to the length of the video. Alternatively, in the case where the length of the video is shorter than the length of the template, there can be considered a method of shortening the length of the template down to the length of the video, and a method of further inserting another video into the difference between the length of the template and the length of the video.

<5. Template Generation>

Here, with reference to FIGS. 23 to 27, template generation processing will be described. The template generation processing corresponds to the new template creation processing of Step S510 shown in FIG. 7, and is executed in the template generation section 115 of the information processing apparatus 100.

For example, in an event such as a sports day, although there is a case where a user continuingly performs shooting using the imaging device 300, there are generally many cases where the user stops shooting temporarily during a preparation time between sporting events, due to an issue of a battery or storage capacity, an issue of physical strength, and the like. Accordingly, it is highly probable that the video data is divided at a good break, such as with respect to each sporting event.

Figure 23:
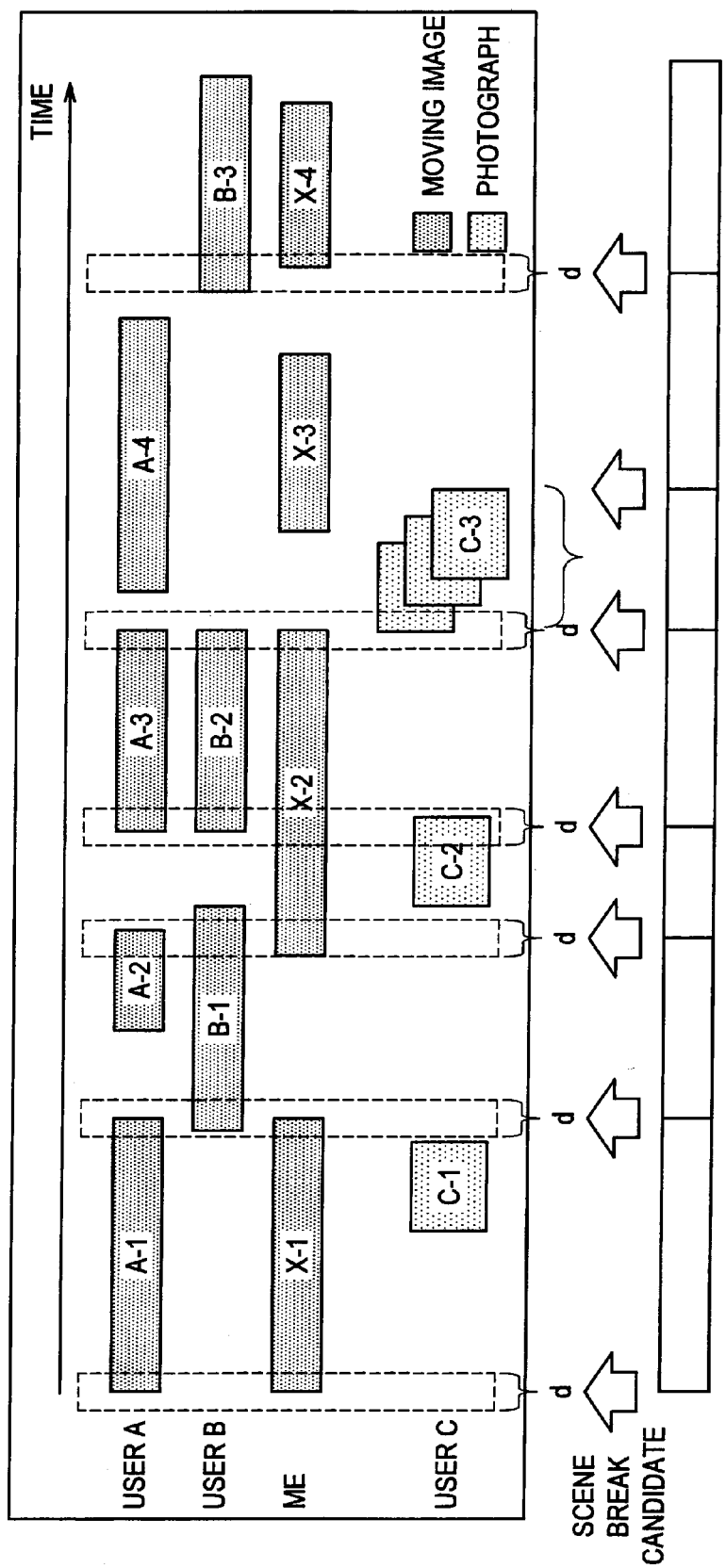
FIG. 23 is an explanatory diagram showing an example of template generation.

Accordingly, first, in the same manner as the video selection screen, based on start time and end time of the videos arranged on the time axis based on shooting time, a scene break candidate is extracted. For example, as shown in FIG. 23, when there are equal to or more than a given number n of start points and end points within an error d, then the error d can be set as a scene break candidate. The user can set values of d and n which are used here.

In this case, it may be set such that the start point and the end point of the video shot by the user himself/herself are given first priority. Alternatively, when M or more photographs are continuously shot at photo shoot duration ΔT of equal to or less than a given time t, before and after the time period during which the photographs are continuously shot can be set as a scene break candidate. In this way, the template is generated based on the automatically extracted scene break.

Figure 24:
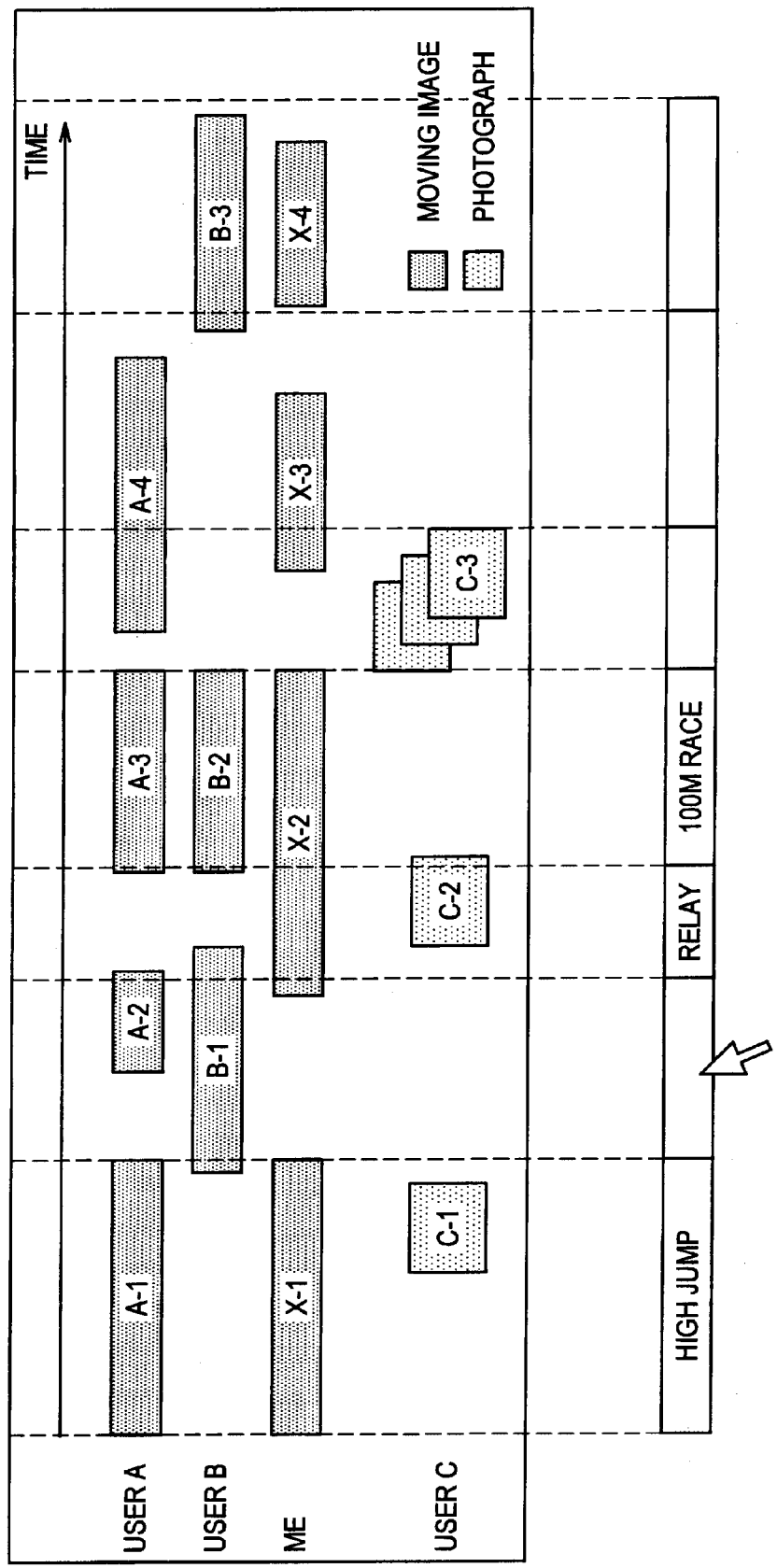
FIG. 24 is an explanatory diagram showing an example of template generation.
Figure 25:
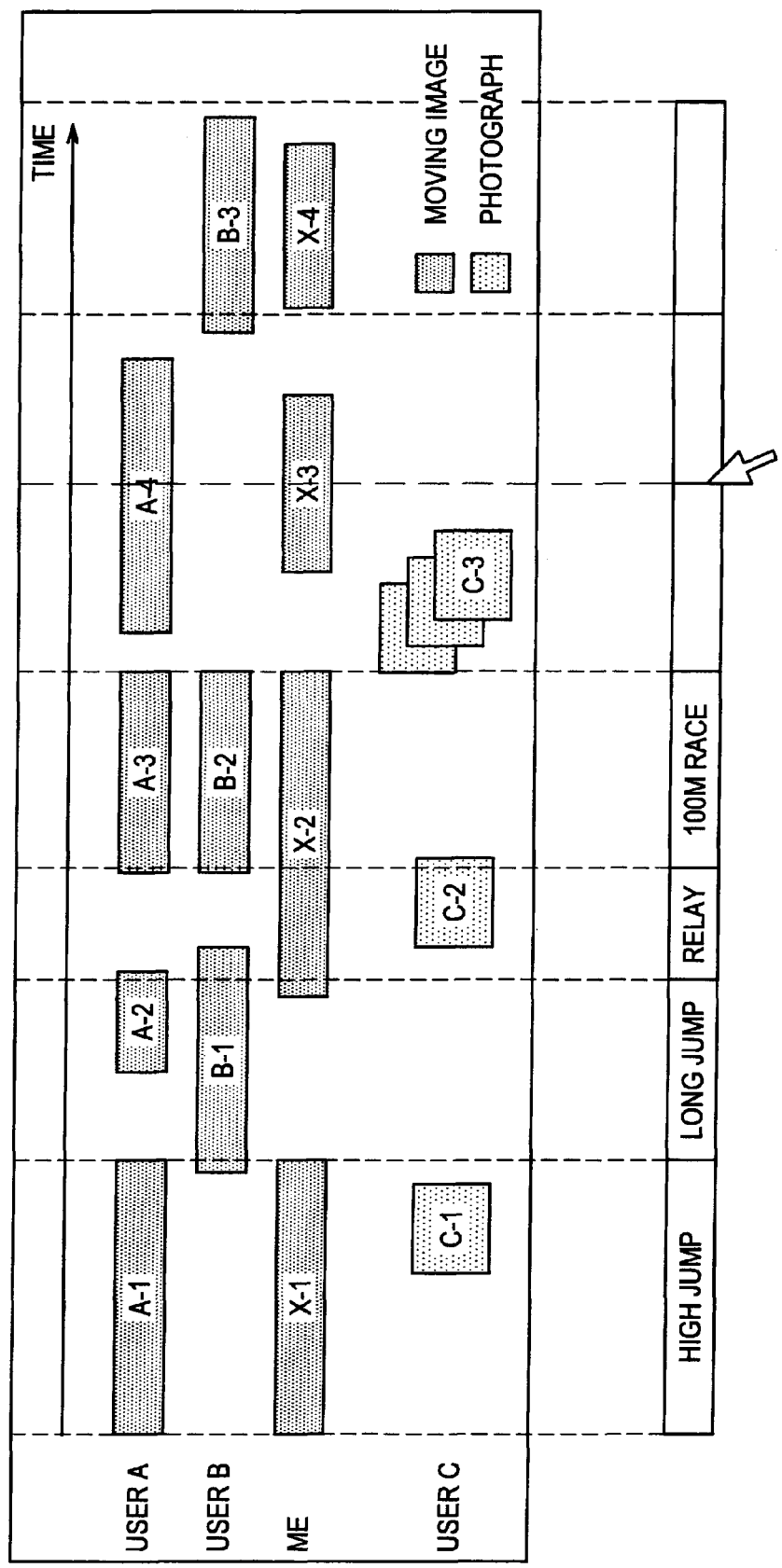
FIG. 25 is an explanatory diagram showing an example of template generation.
Figure 26:
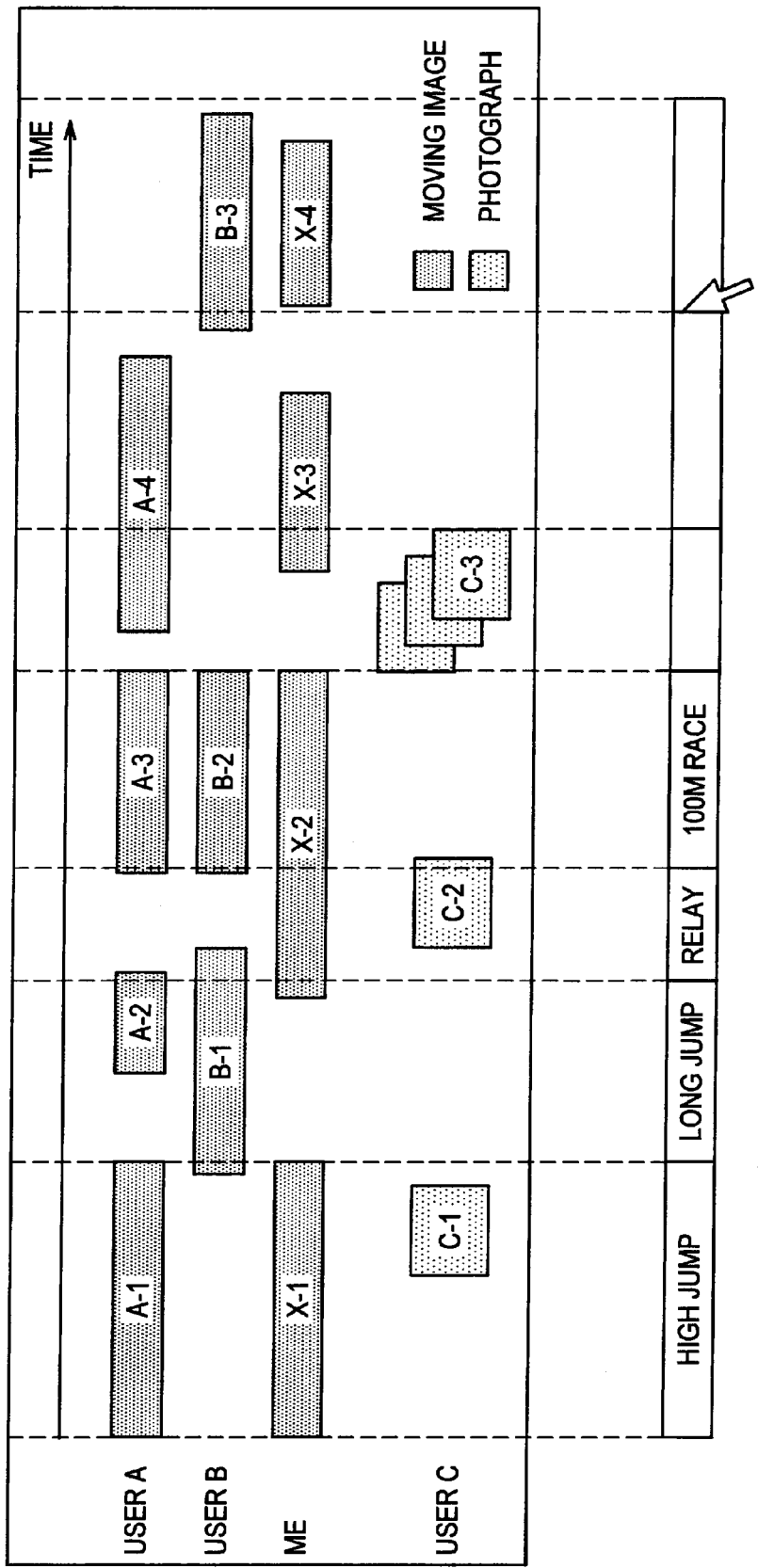
FIG. 26 is an explanatory diagram showing an example of template generation.

The user can additionally edit the automatically generated template. For example, as shown in FIG. 24, the user can provide a scene name to a designated part. Alternatively, as shown in FIG. 25, the user can designate a position and add a scene break. Further, as shown in FIG. 26, the user can also delete the selected scene break.

Further, as shown in FIG. 27, the user can also adjust a length of each scene. The scene length can be adjusted by, for example, designating a line of the scene break that the user wants to adjust, and adjusting the position of the scene break to right/left by drag and drop operation.

<6. Examples of Effects>

As described above, according to the information processing apparatus 100 according to an embodiment of the present disclosure, a user can generate moving image content by using, as materials, a video registered by a community member who belongs to the same community in order to be shared and a video shot by the user.

In this case, since the community is created based on a predetermined theme, each community member can acquire a video according to the predetermined theme. A video shot by another community member is shot from a viewpoint or at a position that is different from the viewpoint from which or the position at which the user shoots a video. Consequently, the community member can create the moving image content using more video materials. In the case of creating the moving image content using the video shot by the user, it was difficult to make varied content of high quality, since only a video from one viewpoint could be used. However, this issue can be solved.

Further, in this case, since the videos which can be used as materials are displayed side-by-side on the time axis based on shooting time, the user can intuitively grasp the videos shot during the same time period at first sight. Since the videos shot during the same time period are displayed side-by-side vertically, there is an advantage that the comparison therebetween is easy. The user can select a video that the user wants to use by a simple operation of drag and drop by performing comparison examination while confirming contents of each video by thumbnail display and the like.

Further, the information processing apparatus 100 can create moving image content based on moving image content created by the user or another community member or a template, and in addition thereto, the information processing apparatus 100 can also newly create a template and use the template. Since it is possible to create moving image content based on moving image content created by another community member and a template, the chances for the user to select an optimum video for a scene cumulatively increases, and the chances for the user to create content of high quality increases.

It should be understood by those skilled in the art that various modifications, combinations, sub-combinations and alterations may occur depending on design requirements and other factors insofar as they are within the scope of the appended claims or the equivalents thereof.

For example, in the embodiment above, it is set that the information processing apparatus 100, which is a client device held by a community member, performs the moving image editing processing, but the present disclosure is not limited to such an example. For example, such a function may be provided by the server.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps processed in the chronological order, the order of the steps may be changed appropriately according to circumstances.

The present disclosure contains subject matter related to that disclosed in Japanese Priority Patent Application JP 2010-136398 filed in the Japan Patent Office on Jun. 15, 2010, the entire content of which is hereby incorporated by reference.

What is claimed is:

1. An information processing apparatus comprising:
    a video acquisition section which acquires a plurality of videos related to a predetermined theme shot by a plurality of imaging devices;
    a display control section which controls a display of a moving image editing screen including a video selection screen in which the plurality of videos acquired by the video acquisition section are arranged around a time axis, wherein the time axis is the time of shooting of each of the plurality of videos, wherein each of the plurality of videos are concurrently replayed on the moving image editing screen in substantially the same time domain, wherein the video selection screen is a screen in which the plurality of videos which are concurrently replayed on the moving image editing screen in substantially the same time domain are sorted based on information of a position at which the video is shot and information of a position at which the video is shot and information of a direction in which the video is shot;
    a moving image generation section which generates a moving image from the plurality of videos based on operation performed by a user to the moving image editing screen;
    a template acquisition section which acquires a template that is a model for creating a moving image based on operation performed by a user; and
    a template generation section which generates the template based on a shooting time of each of the plurality of videos acquired by the video acquisition section.

2. The information processing apparatus according to claim 1,
    wherein the template generation section generates a template by extracting a scene break in the template based on a start time and an end time of the plurality of videos.

3. The information processing apparatus according to claim 2,
    wherein the moving image editing screen further includes a template display screen that displays the template, and
    wherein the display control section controls a display of the moving image editing screen including a video selection screen in which the plurality of videos each having a shooting time corresponding to a selected part of a time axis within a template displayed on the template display screen are arranged on a time axis based on a shooting time of each of the videos.

4. The information processing apparatus according to claim 1,
    wherein the moving image generation section searches for a video from among the plurality of videos based on a search key, and causes the video selection screen to display the video extracted by the search.

5. The information processing apparatus according to claim 1,
    wherein the plurality of videos related to the predetermined theme represent a plurality of videos shared within a community created based on the predetermined theme.

6. The information processing apparatus according to claim 5,
    wherein the plurality of videos related to the predetermined theme represent a plurality of videos shared within a community created based on a shooting location of the videos.

7. The information processing apparatus according to claim 5,
    wherein the plurality of videos include a plurality of videos shared within the community and a video stored in a storage section provided inside the information processing apparatus.

8. The information processing apparatus according to claim 1,
    wherein the video selection screen has a horizontal axis, which represents a time axis, and a vertical axis, and a video displayed on the video selection screen is changed according to change of a granularity of the horizontal axis and/or a granularity of the vertical axis.

9. The information processing apparatus according to claim 1, wherein substantially the same time domain is represented as a point on the time axis.

10. An information processing method comprising:
    acquiring a plurality of videos related to a predetermined theme shot by a plurality of imaging devices;
    displaying a moving image editing screen including a video selection screen in which the plurality of videos acquired in the video acquisition step are arranged around a time axis, wherein the time axis is the time of shooting of each of the plurality of videos, wherein each of the plurality of videos are concurrently replayed on the moving image editing screen in substantially the same time domain, wherein the video selection screen is a screen in which the plurality of videos which are concurrently replayed on the moving image editing screen in substantially the same time domain are sorted based on information of a position at which the video is shot and information of a direction in which the video is shot;
    generating a moving image from the plurality of videos based on operation performed by a user to the moving image editing screen;
    acquiring a template that is a model for creating a moving image based on an operation performed by a user; and
    generating the template based on a shooting time of each of the plurality of videos.

11. The information processing method of claim 10, wherein substantially the same time domain is represented as a point on the time axis.

12. A method comprising implementing a program for causing a computer to function as an information processing apparatus which includes
    a video acquisition section which acquires a plurality of videos related to a predetermined theme shot by a plurality of imaging devices,
    a display control section which controls a display of a moving image editing screen including a video selection screen in which the plurality of videos acquired by the video acquisition section are arranged around a time axis, wherein the time axis is the time of shooting of each of the plurality of videos, wherein each of the plurality of videos are concurrently replayed on the moving image editing screen in substantially the same time domain, wherein the video selection screen is a screen in which the plurality of videos which are concurrently replayed on the moving image editing screen in substantially the same time domain are sorted based on information of a position at which the video is shot and information of a direction in which the video is shot, a moving image generation section which generates a moving image from the plurality of videos based on operation performed by a user to the moving image editing screen, a template acquisition section which acquires a template that is a model for creating a moving image based on an operation performed by a user, and a template generation section which generates the template based on a shooting time of each of the plurality of videos acquired by the video acquisition section.

13. The method of claim 12, wherein substantially the same time domain is represented as a point on the time axis.

* * * * *